United States Patent
Hendry et al.

(10) Patent No.: US 9,654,774 B2
(45) Date of Patent: May 16, 2017

(54) POC VALUE DESIGN FOR MULTI-LAYER VIDEO CODING

(71) Applicant: QUALCOMM Incorporated, San Diego, CA (US)

(72) Inventors: Fnu Hendry, Poway, CA (US); Ye-Kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/567,762

(22) Filed: Dec. 11, 2014

(65) Prior Publication Data

US 2015/0172655 A1 Jun. 18, 2015

Related U.S. Application Data

(60) Provisional application No. 61/915,497, filed on Dec. 12, 2013.

(51) Int. Cl.
| | |
|---|---|
| *H04N 7/18* | (2006.01) |
| *H04N 19/105* | (2014.01) |
| *H04N 19/114* | (2014.01) |
| *H04N 19/136* | (2014.01) |
| *H04N 19/172* | (2014.01) |
| *H04N 19/169* | (2014.01) |
| *H04N 19/44* | (2014.01) |
| *H04N 19/90* | (2014.01) |
| *H04N 19/597* | (2014.01) |
| *H04N 19/70* | (2014.01) |
| *H04N 19/30* | (2014.01) |

(Continued)

(52) U.S. Cl.
CPC ......... *H04N 19/105* (2014.11); *H04N 19/103* (2014.11); *H04N 19/114* (2014.11); *H04N 19/136* (2014.11); *H04N 19/172* (2014.11); *H04N 19/188* (2014.11); *H04N 19/30* (2014.11); *H04N 19/44* (2014.11); *H04N 19/597* (2014.11); *H04N 19/65* (2014.11); *H04N 19/70* (2014.11); *H04N 19/90* (2014.11)

(58) Field of Classification Search
CPC ............ H04N 19/00; H04N 19/00454; H04N 19/00533
USPC ....................... 375/240.11–240.29
See application file for complete search history.

(56) References Cited

U.S. PATENT DOCUMENTS

2014/0254681 A1* 9/2014 Aminlou ............. H04N 19/105
375/240.16
2014/0301439 A1 10/2014 Chen et al.
(Continued)

OTHER PUBLICATIONS

Second Written Opinion from International Application No. PCT/US2014/067363, dated Feb. 26, 2016, 5 pp.
(Continued)

*Primary Examiner* — Andy Rao
(74) *Attorney, Agent, or Firm* — Shumaker & Sieffert, P.A.

(57) ABSTRACT

In an example, a method of decoding video data includes decoding, by a video decoder, a first picture of multi-layer video data, where the first picture has a first picture type. The method also includes, based on the first picture having the first picture type, decoding, by the video decoder, data representative of picture order count (POC) most significant bits (MSB) value for the first picture.

35 Claims, 7 Drawing Sheets

(51) Int. Cl.
H04N 19/103 (2014.01)
H04N 19/65 (2014.01)

(56) References Cited

U.S. PATENT DOCUMENTS

| | | | |
|---|---|---|---|
| 2015/0103927 A1* | 4/2015 | Hannuksela | H04N 19/597 375/240.26 |
| 2015/0139320 A1 | 5/2015 | Wang et al. | |
| 2015/0146787 A1 | 5/2015 | Hendry et al. | |
| 2015/0172667 A1 | 6/2015 | Hendry et al. | |

OTHER PUBLICATIONS

Response to Written Opinion dated Feb. 26, 2016, from International Application No. PCT/US2014/067363, filed on Mar. 25, 2016, 5 pp.
International Preliminary Report on Patentability from International Application No. PCT/US2014/067363, dated April 11, 2016, 9 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.L265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bross, et al., "High Efficiency Video Coding (HEVC) text specification draft 10 (for FDIS & Consent)," JCT-VC Meeting; 103. MPEG Meeting; Jan. 14-23, 2013; Geneva; (Joint Collaborative Team on Video Coding of ISO/IEC JTC1/SC29/WG11 and ITU-T SG.16); Retrieved from the Internet < URL : http://wftp3.itu.int/av-arch/jctvc-site/, >, No. JCTVC-L1003, Jan. 17, 2013, XP030113948, 297 pp.
Chen, et al., "MV-HEVC/SHVC HLS: Cross-layer POC alignment," JCT-3V Meeting; Jul. 25-Aug. 2, 2013; Vienna; (The Joint Collaborative Team on 3D Video Coding Extension Development of ISO/IEC JTC1/SC29/WG11 and ITU-T SG.16); Retrieved from the Internet < URL: http://phenix.int-evry.fr/jct2/ >, No. JCT3V-E0075, Jul. 16, 2013, XP030131078, 4 pp.
Choi, et al., "3D-HEVC HLS: Alignment of Picture order counts," MPEG Meeting; Oct. 23-Nov. 1, 2013; Geneva; (Motion Picture Expert Group or ISO/IEC JTC1/SC29/WG11), No. m24874, Oct. 15, 2013; XP030053217, 5 pp.
Deshpande, "On POC Alignment", JCT-3V Meeting, Oct. 23-Nov. 1, 2013, Geneva, (The Joint Collaborative Team on 3D Video Coding Extension Development of ISO/IEC JTC1/SC29/WG11 and ITU-T SG.16), URL: http://phenix.int-evry.fr/jct2/, No. JCT3V-F0062, Oct. 15, 2013, XP030131469, 6 pp.
Hannuksela, "MV-HEVC/SHVC HLS: on POC Value Derivation", JCT-VC Meeting; Oct. 23-Nov. 1, 2013, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-O0275, Oct. 15, 2013, XP030115343, 2 pp.
Hendry et al., "MV-HEVC/SHVC HLS: On Picture Order Count", JCT-VC Meeting, Jan. 9-17, 2013, San Jose, (Joint Collaborative Team on Video Coding of ISO/IEC JTC1/SC29/WG11 and ITU-T SG. 16), URL: http://wftp3.itu.int/av-arch/jctvc-site/, No. JCTVC-P0041, Dec. 12, 2013, XP030115501, 10 pp.
Ramasubramonian, et al., "MV-HEVC/SHVC HLS: On Flushing of Decoded Pictures from the DPB based on NoOutputOfPriorPicsFlag" JCT-VC Meeting; Oct. 23-Nov. 1, 2013; Geneva, (Joint Collaborative Team on Video Coding of ISO/IEC JTC1/SC29/WG11 and ITU-T SG. 16 ); URL: http://wftp3.itu.int/av-arch/jctvc-site/, No. JCTVC-O0266, Oct. 15, 2013, XP030115331, 8 pp.
Ramasubramonian, et al., "MV-HEVC/SHVC HLS: On picture order count," JCT-VC Meeting; Oct. 23-Nov. 1, 2013; Geneva; (Joint collaborative Team on Video Coding of ISO/IEC JTC1/SC29/WG11 and ITU-T SG. 16); Retrieved from the Internet < URL: http://wftp3itu.int/av-arch/jctvc-site/ >, No. JCTVC-O0213, Oct. 15, 2013, XP030115261, 11 pp.
Sullivan et al., "Overview of the High Efficiency Video Coding (HEVC) Standard", IEEE Transactions on Circuits and Systems for Video Technology, Jan. 2012, XP055045358, 19 pp.
Sullivan, "CRA pictures with broken links", MPEG Meeting; Apr. 27-May 7, 2012; Geneva; (Motion Picture Expert Group or ISO/IEC JTC1/SC29/WG11), Document: JCTVC-I0404; No. m24653, May 7, 2012, XP030052996, 3 pp.
Tech, et al., "MV-HEVC Draft Text 6," JCT-3V Meeting; Oct. 25-Nov. 1, 2013; Geneva; (The Joint Collaborative Team on 3D Video Coding Extension Development of ISO/IEC JTC1/SC29/WG11 and ITU-T SG. 16 ); URL: http://phenix.int-evry.fr/jct2/, No. JCT3V-F1004_v3, Nov. 7, 2013, XP030131734, 84 pp.
Sjoberg, et al., "HLS: Error robust POC alignment," JCT-3V Meeting; Oct. 23-Nov. 1, 2013; (The Joint Collaborative Team on

(56) References Cited

OTHER PUBLICATIONS

3D Video Coding Extension Development of ISO/IEC JTC1/SC29/WG11 and ITU-T SG. 16 ); Document: JCTVC-O0176_v3, Oct. 28, 2013, 8 pp.

Wang, et al., "High Efficiency Video Coding (HEVC) Defect Report 2," JCT-3V Meeting; Oct. 23-Nov. 1, 2013; (The Joint Collaborative Team on 3D Video Coding Extension Development of ISO/IEC JTC1/SC29/WG11 and ITU-T SG. 16 ); Document: JCTVC-O1003_v1, 311 pp.

Chen, et al., "High efficiency video coding (HEVC) scalable extension Draft 4," JCT-3V Meeting; Oct. 23-Nov. 1, 2013; (The Joint Collaborative Team on 3D Video Coding Extension Development of ISO/IEC JTC1/SC29/WG11 and ITU-T SG. 16 ); Nov. 14, 2013; Document: JCTVC-O1008_v1, 76 pp.

Tech, et al., "MV-HEVC Draft Text 9", JCT-3V Meeting; Jul. 3-9, 2014; Sapporo; (The Joint Collaborative Team on 3D Video Coding Extension Development of ISO/IEC JTC1/SC29/WG11 and ITU-T SG.16); URL: http://phenix.int-evry.fr/jct21, No. JCT3V-I1002, Jul. 10, 2014, 165 pp.

Ramasubramonian, et al., "MV-HEVC/SHVC HLS: Sub-DPB based DPB operations," Oct. 23-Nov. 1, 2013; (The Joint Collaborative Team on 3D Video Coding Extension Development of ISO/IEC JTC1/SC29/WG11 and ITU-T SG.16); Oct. 15, 2013; Document: JCTVC-O0217, 4 pp.

International Search Report and Written Opinion from International Application No. PCT/US2014/070051, dated Mar. 12, 2015, 13 pp.

International Search Report and Written Opinion from International Application No. PCT/US2014/070023, dated Mar. 12, 2015, 14 pp.

Response to Written Opinion dated Mar. 12, 2015, from International Application No. PCT/US2014/070023, filed on Oct. 12, 2015, 6 pp.

Second Written Opinion from International Application No. PCT/US2014/070023, dated Nov. 13, 2015, 6 pp.

Response to Second Written Opinion dated Nov. 13, 2015, from International Application No. PCT/US2014/070023, filed on Jan. 13, 2016, 16 pp.

International Preliminary Report on Patentability from International Application No. PCT/US2014/070023, dated Mar. 3, 2016, 9 pp.

Tech, et al., "Preliminary version of MV-HEVC Draft Text 6," Oct. 25-Nov. 1, 2013; (The Joint Collaborative Team on 3D Video Coding Extension Development of ISO/IEC JTC1/SC29/WG11 and ITU-T SG.16); Nov. 18, 2013, Document: JCT3V-F1004_v3, 90 pp.

* cited by examiner

POC VALUE DESIGN FOR MULTI-LAYER VIDEO CODING

This application claims the benefit of U.S. Provisional Application No. 61/915,497, filed Dec. 12, 2013, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for improving error resilience for coding video data related to reference pictures. In particular, this disclosure describes a picture order count (POC) value design that may improve such error resilience. These techniques may be used when coding single layer video data or multi-layer video data. In general, these techniques include, prior to performing a POC resetting process, outputting pictures stored to a decoded picture buffer (DPB) to improve error resilience in the picture outputting process. For example, a video decoder may be configured to output all pictures from the DPB (e.g., output all pictures in the DPB that are marked as being needed for output) prior to decoding an initial picture of an access unit in which POC resetting is performed. In this manner, POC values of pictures stored to the DPB may remain aligned, thereby allowing the pictures of the access unit to be output in the proper order.

This disclosure also includes techniques for properly determining POC values of pictures in a multi-layer bitstream. For example, according to aspects of this disclosure, a video decoder may be configured to determine a picture type of a picture being decoded and, based on the picture type, decode data indicating a POC most significant bits (MSB) value for the picture being decoded. In this manner, the POC MSB value for the picture being decoded may be determined without referencing a POC MSB of another picture in the multi-layer bitstream. Determining the POC MSB in this way may improve error resilience in instances in which a relatively large number of POC values separate the picture being decoded from a picture that precedes the picture being decoded in coding order (e.g., as may occur with upswitching or downswitching of the multi-layer bitstream).

In one example, a method of decoding video data includes decoding data that indicates a picture order count (POC) reset for a POC value of a first picture of a first received layer of multi-layer video data, wherein the first picture is included in an access unit, and based on the data that indicates the POC reset for the POC value of the first picture and prior to decoding the first picture, outputting all pictures stored in a decoded picture buffer (DPB) that precede the first picture in coding order and that are not included in the access unit.

In another example, a method of encoding video data includes encoding, by a video encoder, data that indicates a picture order count (POC) reset for a POC value of a first picture of a first received layer of multi-layer video data, wherein the first picture is included in an access unit, and based on the data that indicates the POC reset for the POC value of the first picture and prior to decoding the first picture, outputting all pictures stored in a decoded picture buffer (DPB) that precede the first picture in coding order and that are not included in the access unit.

In another example, a device for coding video data includes a memory comprising a decoded picture buffer (DPB) configured to store multi-layer video data. The device also includes a video coder configured to code data that indicates a picture order count (POC) reset for a POC value of a first picture of a first received layer of the multi-layer video data, wherein the first picture is included in an access unit, and based on the data that indicates the POC reset for the POC value of the first picture and prior to decoding the first picture, output all pictures stored in the DPB that precede the first picture in coding order and that are not included in the access unit.

In another example, a device for coding video data includes means for coding data that indicates a picture order count (POC) reset for a POC value of a first picture of a first received layer of multi-layer video data, wherein the first picture is included in an access unit, and based on the data that indicates the POC reset for the POC value of the first picture and prior to decoding the first picture, means for outputting all pictures stored in a decoded picture buffer (DPB) that precede the first picture in coding order and that are not included in the access unit.

In another example, a non-transitory computer-readable storage medium has stored thereon instructions that, when executed, cause a processor of a device for coding video data to code data that indicates a picture order count (POC) reset for a POC value of a first picture of a first received layer of multi-layer video data, wherein the first picture is included in an access unit, and based on the data that indicates the POC reset for the POC value of the first picture and prior to decoding the first picture, output all pictures stored in a decoded picture buffer (DPB) that precede the first picture in coding order and that are not included in the access unit.

In another example, a method of decoding video data includes decoding, by a video decoder, a first picture of multi-layer video data, wherein the first picture has a first picture type, and based on the first picture having the first picture type, decoding, by the video decoder, data representative of picture order count (POC) most significant bits (MSB) value for the first picture.

In another example, a method of encoding video data includes encoding, by a video encoder, a first picture of multi-layer video data, wherein the first picture has a first picture type, and based on the first picture having the first picture type, encoding, by the video encoder, data representative of picture order count (POC) most significant bits (MSB) value for the first picture.

In another example, a device for coding video data includes a memory configured to store multi-layer video data. The device also includes a video coder configured to code a first picture of the multi-layer video data, wherein the first picture has a first picture type, and based on the first picture having the first picture type, code data representative of picture order count (POC) most significant bits (MSB) value for the first picture.

In another example, a device for coding video data includes means for coding a first picture of multi-layer video data, wherein the first picture has a first picture type, and based on the first picture having the first picture type, means for coding data representative of picture order count (POC) most significant bits (MSB) value for the first picture.

In another example, a non-transitory computer-readable storage medium has stored thereon instructions that, when executed, cause a processor of a device for coding video data to code a first picture of multi-layer video data, wherein the first picture has a first picture type, and based on the first picture having the first picture type, code data representative of picture order count (POC) most significant bits (MSB) value for the first picture.

The details of one or more examples are set forth in the accompanying drawings and the description below. Other features, objects, and advantages will be apparent from the description and drawings, and from the claims.

DETAILED DESCRIPTION

Figure 1:
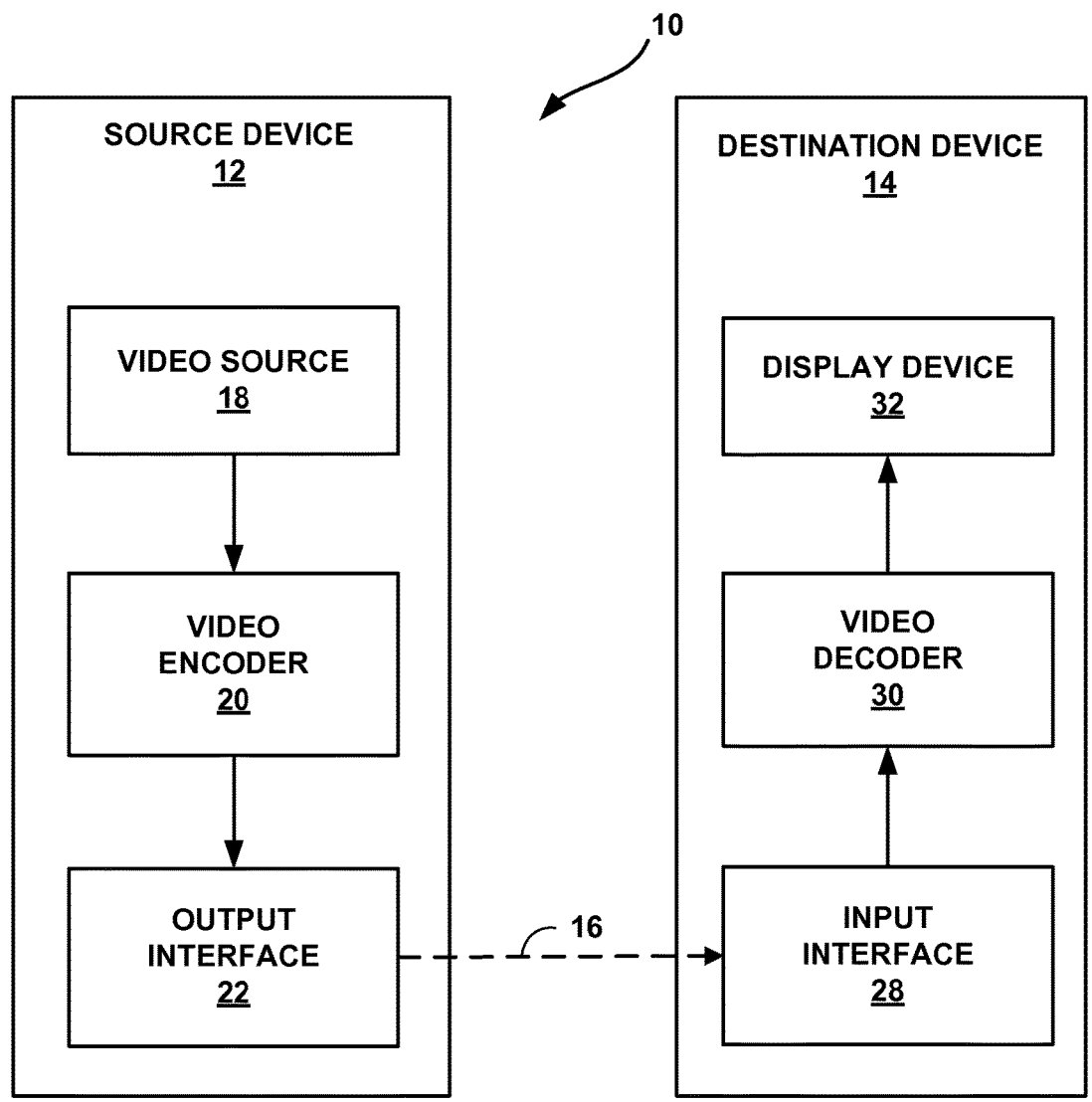
FIG. 1 is a block diagram illustrating an example video encoding and decoding system that may utilize techniques for coding POC value information according to the techniques of this disclosure.

In general, this disclosure describes a picture order count (POC) value design for video coding, which may be beneficial for multi-layer video coding. This disclosure describes various design improvements for signaling and derivation of POC values in multi-layer video coding. However, while the techniques are generally described with respect to multi-layer video coding, the techniques of this disclosure may also be applied to single-layer video coding.

POC values may indicate a display order of pictures and may generally be used to identify the picture. For example, a picture having a POC value of 0 (i.e., a picture having a POC value equal to 0) is displayed prior to a picture having a POC value of 1. When a block of a current picture is inter-predicted relative to a reference picture, the reference picture may be identified using a POC value for the reference picture. More particularly, POC values for reference pictures to be included in a reference picture list may be signaled in a parameter set, such as sequence parameter set (SPS), picture parameter set (PPS), and/or a slice header corresponding to the block. In this manner, a video encoder may identify a reference picture by signaling an index into the reference picture list corresponding to the position of the reference picture in the reference picture list, and a video decoder may identify the reference picture by constructing the reference picture list (based on the POC values) and using the reference index to identify the position of a reference picture in the reference picture list.

POC values may be composed of least significance bits (LSBs) and most significant bits (MSBs). Rather than increasing POC values of pictures indefinitely during coding, the LSB of a POC value of a picture may be periodically reset to be equal to zero. POC values are typically reset for an Instantaneous Decoder Refresh (IDR) picture. In addition, the video coder may decrement the POC values of pictures that have been processed and stored to a decoded picture buffer (DPB) previous to the current picture associated with the POC reset. The POC values of reference pictures that have been decremented may have a negative value in order to maintain the appropriate output order of such pictures.

In multi-layer video coding (e.g., multi-view video coding, scalable video coding, or the like), a DPB may be partitioned into "sub-DPBs," with each layer of video data assigned to a separately managed sub-DPB of the DPB. A view component may comprise an encoded picture for a particular layer or view at a particular time (in terms of display order, or output order). An access unit is, generally, a unit of data including all view components (e.g., all network abstraction layer (NAL) units) for a common temporal instance. Accordingly, an access unit for a particular temporal instance may include respective view components from respective sub-DPBs. In some instances, an access unit may include fewer than all of the view components associated with a multi-layer bitstream. For example, for a multi-layer bitstream having a base layer and an enhancement layer, in some instances, an access unit may include only a picture of an enhancement layer. In this example, a video decoder may receive the access unit containing only the enhancement layer view component of the multi-layer bitstream.

The view components of an access unit are typically intended to be output together (i.e., output substantially simultaneously), where outputting a picture generally involves transferring pictures from the DPB (e.g., storing pictures from the DPB to an external memory, sending the pictures from the DPB to a display, removing pictures from the DPB, or the like).

A video coder may use an output and bumping process to output pictures from the DPB that are marked as "needed for output" and "unused for reference." In some instances, the picture output process may be invoked two times for each picture, including (1) before the decoding of the picture but after parsing the slice header of the first slice of the picture, and (2) when the last decoding unit of the picture is removed from the coded picture buffer. When the bumping process is invoked, the process outputs pictures that belong to the selected access unit.

Existing POC designs (e.g., as noted below) may not be optimized. For example, in some instances, decrementing POC values may be a layer-specific process. Hence, the POC values of earlier pictures in a sub-DPB (e.g., pictures that have been processed and stored to the sub-DPB previously to the picture currently being coded) for a layer may not be cross-layer aligned with the POC values of earlier pictures in other sub-DPBs when POC values or a POC MSB value of pictures of a layer are reset during the decoding of a picture of that layer, as described in the example below. Cross-layer alignment, for example, occurs when each picture of an access unit has the same POC value, such that the pictures of the access unit are output simultaneously or nearly simultaneously. In existing POC designs, POC values of the pictures in higher layers (e.g., layers having relatively larger layer identifiers) may not be updated until after decoding of the first slice of the picture in the respective layer has started. Updating the POC or POC MSB in this manner may create a problem for picture output through the bumping process, which requires cross-layer alignment of POC values for each access unit that contains decoded pictures in the DPB.

In an example for purposes of illustration, assume a multi-layer sequence has three layers (e.g., layers A, B, and C). In addition, assume that a particular access unit includes pictures for which POC resetting is performed. In this example, a video decoder may reset the POC value of a layer A picture of the access unit (e.g., upon receiving an indication in a bitstream to perform a POC reset). The video decoder may also decrement pictures of layer A that were previously stored to the sub-DPB for layer A to maintain the appropriate output order. However, while decoding the first picture of layer A and prior to decoding the layer B picture of the access unit, the POC values of pictures for layers B and C that are stored to the respective sub-DPBs for layers B and C become non-aligned (not cross-layer aligned) with the POC values of the pictures stored to the sub-DPB of layer A. That is, because the layer B picture and the layer C picture of the access unit have not yet been reset, the POC values of the respective sub-layers of each of layers B and C have also not yet been decremented.

Such non-alignment during decoding may cause the pictures to be output from the DPB in the improper order. For example, pictures of an access unit (e.g., having the same temporal instance) are typically intended to be output at the same or substantially the same time. In general, a video coder may output pictures on an access unit by access unit basis (e.g., pictures of one access unit at a time) based on POC values of pictures of the access unit. That is, a video coder may select a particular access unit for output based on the POC value of pictures of the access unit and whether the pictures of the access unit are needed for reference. The video coder may output pictures of an access unit having the smallest POC value in the DPB and that are no longer needed for reference (e.g., pictures that are marked needed for output).

When POC values for pictures become non-aligned within an access unit (e.g., due to POC value resetting described above), the video coder may not output pictures in the appropriate order. For example, when POC values are not cross-layer aligned within an access unit, the video coder may output fewer than all of the pictures for one access unit prior to outputting a picture from another access unit, rather than outputting all pictures of one access unit together (for a single temporal instance) prior to moving to another access unit.

The POC value design described in this disclosure includes various aspects, any or all of which may be implemented alone or in any combination. The techniques of this disclosure may overcome the issue discussed above. In one example, according to aspects of this disclosure, a video decoder may receive an access unit for which POC value resetting is performed. The video decoder may, prior to performing the POC value resetting, output all pictures stored to a decoded picture buffer (DPB) of the video coder. That is, the video decoder may output all pictures stored to the DPB that have been marked as being needed for output prior to decoding an initial picture of the access unit for which POC value resetting is performed.

In this manner, according to aspects of this disclosure, POC values of pictures stored to the DPB may remain aligned when output. That is, the video decoder may output the pictures stored to the DPB prior to POC value resetting, such that the POC values of the pictures stored to the DPB maintain their previous, cross-layer aligned POC values (e.g., pictures having the same temporal instance in a multi-layer bitstream maintain the same POC values). Outputting the pictures of the DPB in this way, prior to POC resetting, may help to ensure that pictures of the same temporal instance (in the same access unit and having the same POC values) are output at the same or substantially the same time.

Other techniques of this disclosure relate to derivation of POC values. As described in greater detail below, a POC value may be composed of a combination of a LSB value and a MSB value. A video coder may typically derive the POC MSB value based on the POC MSB value of the previous picture in decoding order at a temporal sub-layer zero of a multi-layer bitstream. Accordingly, the POC MSB value for a current picture typically depends on a POC MSB value of a picture that precedes the current picture in coding order.

This type of POC MSB value dependency may present an issue when performing up-switching and/or down-switching with multi-layer video coding. For example, up-switching may occur when an addition layer is added to a multi-layer bitstream. Up-switching may occur, for example, in instances in which the amount of available bandwidth is sufficient to allow an additional layer of video data to be added for a potentially better viewing experience. Down-switching may occur when a layer of video data is removed from a multi-layer bitstream, e.g., due to bandwidth or other constraints.

One potential POC MSB value derivation issue may occur when a video coder up-switches after a relatively long period of being down-switched (e.g., at least longer than half of maximum POC LSB period) and when an intra-random access point (IRAP) picture type that is used to enable the up-switching is a clean random access (CRA). In such instances, the video coder may be unable to appropriately determine the POC MSB value of the first picture of the new layer being up-switched to, because the previous picture in coding order (from which the POC MSB value is derived) is obsolete.

In an example for purposes of illustration, a multi-layer bitstream may include a first layer and a second layer. A video coder may down-switch from processing the first layer and the second layer to only processing the first layer. The final picture of the second layer may have a POC value, in this example, of 50 (i.e., POC MSB is 0 and POC LSB is 50). The video coder may code 250 pictures of the first layer only. The video coder may then up-switch to code both the first layer and the second layer. In general, the video coder may derive the POC value for the first picture of the second layer (after up-switching) based on the last coded picture of the second layer (prior to down-switching), e.g., as 50+250=300 (e.g., the POC of the final picture of the second layer prior to down-switching plus the 250 pictures of the first layer only).

However, with an eight bit LSB value, only 256 possible POC LSB values are available. In the example above, that the POC MSB is increased by 256 for the first picture of the second layer after up-switching (i.e., POC MSB is 256 and POC LSB is 44). Accordingly, the POC value for the first picture of the second layer after up-switching may be in the next cycle of POC MSB values. For example, in the example above, 300 exceeds the 256 possible POC LSB values, so the POC MSB value for the first picture of the second layer after up-switching will be associated with a new cycle of POC MSB values. In this example, the POC MSB value from the last picture of the second layer prior to the down-switching has been rendered obsolete for purposes of determining the POC MSB value of the first picture of the second layer after up-switching, because the video coder must reference a POC MSB value that is included in a previous cycle of POC MSB values. That is, the video coder may not be able to use the last picture of the second layer prior to the down-switching to derive the POC MSB value of the first picture of the second layer after up-switching. This POC MSB value referencing issue may arise any time the distance between the last picture of the second layer prior to the down-switching and the first picture of the second layer after up-switching is more than half of the 256 picture cycle length between down-switching and up-switching.

Certain techniques of this disclosure may overcome the issue discussed above. For example, according to aspects of this disclosure, a video decoder may be configured to determine a picture type of a picture being decoded and, based on the picture type (i.e., the determined picture type), decode data indicating a POC MSB value for the picture being decoded. For example, there may generally be a set of picture types for which POC MSB values are coded and another set of picture types for which POC MSB values are not coded. The video coder may code the POC MSB value for a picture only when a picture type for the picture is included in the set of picture types for which POC MSB values are coded. In this manner, the video coder may determine the POC MSB value for the picture being coded using the data indicating the POC MSB value, without referencing a POC MSB of another picture in the multi-layer bitstream. Determining the POC MSB in this way may improve error resilience in instances in which a relatively large number of POC values separate the picture being decoded from a picture that precedes the picture being decoded in coding order (e.g., as may occur with up-switching or down-switching with layers of the multi-layer bitstream).

Applying the techniques to the example described above, the video coder may determine that the first picture being decoded in the second layer after up-switching to the second layer is a CRA picture type. In this example, the video decoder may, based on the determination that the picture type is CRA, decode data indicating the POC MSB value for the first picture of the second layer after up-switching. In this manner, the video decoder need not reference the POC MSB of the final picture of the second layer that was decoded prior to down-switching. While the example above is described with respect to the CRA picture type, the techniques may also be implemented with other picture types, such as the broken link access (BLA) picture type or other picture types.

FIG. 1 is a block diagram illustrating an example video encoding and decoding system 10 that may utilize techniques for managing POC values according to the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding POC value information according to the techniques of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for managing POC values according to the techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14. e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video coding standard. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/15_Geneva/wg11/JCTVC-O1003-v1.zip. The multiview extension to HEVC, namely MV-HEVC, is also being developed by the JCT-3V. A recent Working Draft (WD) of MV-HEVC, referred to as MV-HEVC WD6 hereinafter, is available from http://phenix.it-sudparis.eu/jct2/doc_end_user/documents/6_Geneva/wg11/JCT3V-F1004-v6.zip. The scalable extension to HEVC, named SHVC, is also being developed by the JCT-VC. A recent Working Draft (WD) of SHVC and referred to as SHVC WD4 hereinafter, is available from http://phenix.int-evry.fr/jct/doc_end_user/documents/15_Geneva/wg11/JCTVC-O1008-v1.zip. The techniques of this disclosure, however, are not limited to any particular coding standard. Other examples of video coding standards include MPEG-2 and ITU-T H.263.

The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

Motion information for an inter-predicted PU (more particularly, an inter-predicted portion of a CU to which a PU corresponds) may include a reference picture list identifier and a reference index corresponding to a position of a reference picture in the reference picture list. Video encoder 20, for example, may construct the reference picture list (including any modifications made to an originally-constructed reference picture list), and perform a motion search among the reference pictures in the reference picture list to identify a closely matching block (e.g., based on sum of absolute difference (SAD) metrics, or similar metrics), also referred to as a reference block. In order to signal the location of the reference block, video encoder 20 may encode the reference picture list identifier and the reference index for the PU. Furthermore, video encoder 20 may encode data representative of reference pictures to be included in the reference picture list, e.g., by signaling data representative of POC values for the reference pictures in a slice header and/or in a parameter set, such as a PPS or an SPS.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Coded video segments may be organized into NAL units, which provide a "network-friendly" video representation addressing applications such as video telephony, storage, broadcast, or streaming. NAL units can be categorized as Video Coding Layer (VCL) NAL units and non-VCL NAL units. VCL units may contain output from the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

As noted above, video encoder 20 and video decoder 30 may generally be configured to operate according to a video coding standard or an extension to a video coding standard, such as MV-HEVC or SHVC. Thus, for purposes of example, techniques of this disclosure are described below with respect to MV-HEVC, but it should be understood that these techniques may be applied to other video coding standards or extensions, such as SHVC.

In HEVC, there are a number of different picture types that can be identified by the NAL unit type. One picture type is a random access picture type, which may generally include IDR pictures, a clean random access (CRA) pictures, a temporal layer access (TLA) pictures, broken link access (BLA) pictures, STSA (Step-wise Temporal Sub-layer Access) pictures, leading pictures (i.e., RASL and RADL pictures noted below) or a number of other different picture types.

CRA picture syntax specifies the use of an independently coded picture at the location of a random access point (RAP), i.e., a location in a bitstream at which a decoder can begin successfully decoding pictures without needing to decode any pictures that appeared earlier in the bitstream, which supports an efficient temporal coding order known as open GOP operation. Support for random access may be needed to enable channel switching, seek operations, and dynamic streaming services. Some pictures that follow a CRA picture in decoding order and precede the CRA picture in display order may contain inter-picture prediction references to pictures that are not available at the decoder. These non-decodable pictures are therefore discarded by a decoder that starts its decoding process at a CRA point. For this purpose, such non-decodable pictures are identified as random access skipped leading (RASL) pictures. The location of splice points from different original coded bitstreams may be indicated by broken link access (BLA) pictures. A bitstream splicing operation may be performed by simply changing the NAL unit type of a CRA picture in one bitstream to the value that indicates a BLA picture and concatenating the new bitstream at the position of a RAP picture in the other bitstream.

Video encoder 20 and video decoder 30 may assign each picture of a video sequence a POC value for identification of the picture. Video encoder 20 may encode (and video decoder 30 may decode) data representative of reference pictures to be included in the reference picture list, e.g., by signaling data representative of POC values for the reference pictures in a slice header and/or in a parameter set, such as a PPS or an SPS. A POC value, represented by the syntax element PicOrderCntVal, for a particular coded picture denotes the picture's relative order in the picture output process with respect to other pictures in the same coded video sequence.

A POC value includes LSBs and MSBs. The POC may be obtained by concatenating or adding the MSB with the LSB. The LSB may be signaled in the slice header, and the MSB may be computed by video decoder 30 based on the NAL unit type of the current picture and the MSB and LSB of the previous picture in decoding order that is not of NAL unit type random access skipped leading (RASL) or random access decodable leading (RADL), or not a sub-layer non-reference picture, and that has a temporal_id value that is equal to 0. Such pictures that have TemporalId equal to 0 and nuh_layer_id equal to nuh_layer_id of the current picture and that are not RASL pictures, RADL pictures, or sub-layer non-reference pictures, are referred to as POC-anchor pictures.

When the current picture is an intra-random access point (IRAP) picture with NoRaslOutputFlag equal to 1, or a CRA picture that is the first picture of the bitstream, the value of POC MSB is inferred (i.e., determined by the coder) to be equal to 0. In a multi-layer bitstream (e.g., an SHVC or MV-HEVC bitstream with more than one layer), there may exist access units where one or more than one picture is an IRAP picture and one or more pictures are non-IRAP pictures. Such AUs may be referred to as non-aligned IRAP AUs. When decoding bit streams containing non-aligned IRAP AUs, it may be that the POC derived for the picture based on the POC LSB values signaled would violate the bitstream requirement that all the pictures (e.g., pictures of each layer) in an access unit should have the same value of PicOrderCntVal.

Accordingly, in some instances, POC values may be reset for all pictures of a particular access unit in order to maintain POC alignment of the pictures in the access unit. In MV-HEVC WD5, a flag poc_reset_flag syntax element may be used to reset the POC of the pictures such that even when non-aligned IRAP AUs are present in the bitstream, the value of PicOrderCntVal of the current picture and the pictures in the DPB would be adjusted such that the POC of all the pictures in an AU are the same.

Chen et al., "CROSS-LAYER POC ALIGNMENT FOR MULTI-LAYER BITSTREAMS THAT MAY INCLUDE NON-ALIGNED IRAP PICTURES," U.S. Patent application Ser. No. 14/245,115, filed Apr. 4, 2014, describes another method of achieving a POC reset, which uses two flags: poc_msb_reset_flag and poc_lsb_reset_flag. The former flag resets the MSB of PicOrderCntVal, and the latter flag resets the LSB of the PicOrderCntVal. Both these flags are signaled in the slice header.

U.S. Provisional No. 61/890,868, filed Oct. 14, 2013 proposes an SEI message containing information for recovery of correct POC values when a picture that contains either POC MSB or POC resetting indication is lost.

Hannuksela et al., "MV-HEVC/SHVC HLS: on POC value derivation," Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, JCTVC-O0275v3 (available at http://phenix.int-evry.fr/jct/doc_end_user/documents/15_Geneva/wg11/JCTVC-O0275-v3.zip) and Sjoberg et al., "HLS: Error robust POC alignment," Joint Collaborative Team on Video Coding (JCT-VC) of ITU-T SG 16 WP 3 and ISO/IEC JTC 1/SC 29/WG 11, 15th Meeting: Geneva. CH, 23 Oct.-1 Nov. 2013, JCTVC-O0176v3 (available at http://iphenix.int-evry.fr/jct/doc_end_user/documents/15_Geneva/wg11/JCTVC-O0176-v3.zip), propose other methods for signaling and deriving POC values in multi-layer video coding.

U.S. application Ser. No. 14/552,129, filed Nov. 24, 2014 proposes to replace the two flags (i.e., poc_msb_reset_flag and poc_lsb_reset_flag) with a two-bit POC reset indicator and introduces the concept of POC resetting period wherein each POC resetting period is identified by a POC resetting period identifier, which is required to be different for two consecutive POC resetting periods. With such concepts, the error resiliency of POC reset mechanism is improved, such that it is possible for decoder to keep cross-layer alignment of POC in cases of the loss of one or more pictures in the access unit where the POC reset is performed.

Video encoder 20 may assign slices to respective POC resetting periods. Each POC resetting period may include one or more slices. Thus, when POC values are reset for a POC resetting period (including resetting POC values of reference pictures preceding the POC resetting period in coding order), video encoder 20 may signal POC values of reference pictures to be included in a reference picture list based on the reset POC values.

Video encoder 20 and video decoder 30 may perform picture output and bumping of pictures stored to the DPB using POC values. The picture output and bumping process is the process to output pictures that are marked as "needed for output" and "unused for reference" from the DPB. After the adoption of Ramasubramonian et al., "MV-HEVC/SHVC HLS: Sub-DPB based DPB operations," Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, JCTVC-O0217 (available at http://phenix.int-evry.fr/jct/doc_end_user/documents/15_Geneva/wg11/JCTVC-O0217-v1.zip), the concept for outputting and bumping pictures of the DPB for HEVC extensions has been updated to incorporate the following:

Specify a separate DPB capacity for each layer so called sub-DPB

There is no sharing of sub-DPB capacity across layers

Each layer has its own parameters (max pictures, max latency, max reordering)

Distinct parameters for each "output layer set"

Change the definition of an operation point to be specific to an output layer set instead of a 'layer set"

After the changes, picture output and bumping process works as follows: for decoder conformance, the picture output process is invoked two times for each picture, including (1) before the decoding of the picture but after parsing the slice header of the first slice of the picture, and (2) when the last decoding unit of the picture is removed from the coded picture buffer. When the bumping process is invoked, the process outputs all pictures that belong to the selected access unit. In other words, bumping process is not a layer specific process as it outputs all pictures that belongs to the same access unit regardless their layer identification.

The picture output process is the process to empty a storage buffer for the decoded picture buffer when the picture has been marked as "not needed for output" and "not needed for reference." The picture output process works layer specifically as removal of pictures that is invoked for a specific layer shall not remove pictures from other layer.

An example operation of the output order for a DPB, including picture output, bumping, and removal after inclusion of the additions in JCTVC-O0217 and of Ramasubramonian et al., "MV-HEVC/SHVC HLS: On flushing of decoded pictures from DPB based on NoOutputOfPriorPicsFlag," Joint Collaborative Team on Video Coding (JCT-VC) of ITU-T SG 16 WP 3 and ISO/IEC JTC 1/SC 29/WG 11, 15th Meeting: Geneva. CH, 23 Oct.-1 Nov. 2013, 00266 (available at http://phenix.int-evry.fr/jct/doc_end_user/documents/15_Geneva/wg11/JCTVC-O0266-v1.zip) to MV-HEVC WD6 is as follows:

C.5.2 Operation of the Output Order DPB

C.5.2.1 General

The decoded picture buffer consists of sub-DPBs, and each sub-DPB contains picture storage buffers for storage of decoded pictures of one layer only. Each of the picture storage buffers of a sub-DPB contains a decoded picture that is marked as "used for reference" or is held for future output.

The process for output and removal of pictures from the DPB, the process for picture decoding, marking, additional bumping, and storage, and the "bumping" process are specified below. These processes are applied independently for each layer, starting from the base layer, in increasing order of the nuh_layer_id values of the layers in the bitstream. When these processes are applied for a particular layer, only the sub-DPB for the particular layer is affected except for the "bumping" process, which may crop and output pictures, mark pictures as "not needed for output" and empty picture storage buffers for any layer.

Let picture n and the current picture be the coded picture or decoded picture of the access unit n for a particular value of nuh_layer_id, wherein n is a non-negative integer number.

When these processes are applied for a layer with nuh_layer_id equal to currLayerId, the variables MaxNumReorderPics, MaxLatencyIncreasePlus1, MaxLatencyPictures, and MaxDecPicBufferingMinus1 are derived as follows:

If a CVS conforming to one or more of the profiles specified in Annex G or H is decoded by applying the decoding process specified in clauses 2-10, Annex F, and Annex G or H, the following applies:

MaxNumReorderPics is set equal to max_vps_num_reorder_pics[TargetOptLayerSetIdx][HighestTid] of the active VPS.

MaxLatencyIncreasePlus1 is set equal to the value of the syntax element max_vps_latency_increase_plus1[TargetOptLayerSetIdx][HighestTid] of the active VPS.

MaxLatencyPictures is set equal to VpsMaxLatencyPictures[TargetOptLayerSetIdx][HighestTid] of the active VPS.

MaxDecPicBufferingMinus1 is set equal to the value of the syntax element max_vps_dec_pic_bufferng_minus1[TargetOptLayerSetIdx][currLayerId][HighestTid] of the active VPS.

Otherwise (a CVS conforming to one or more of the profiles specified in Annex A is decoded by applying the decoding process specified in clauses 2-10), the following applies:

MaxNumReorderPics is set equal to sps_max_num_reorder_pics[HighestTid] of the active SPS for the base layer.

MaxLatencyIncreasePlus1 is set equal to sps_max_latency_increase_plus1[HighestTid] of the active SPS for the base layer.

MaxLatencyPictures is set equal to SpsMaxLatencyPictures[HighestTid] of the active SPS for the base layer.

MaxDecPicBufferingMinus1 is set equal to sps_max_dec_pic_buffering_minus1 [HighestTid] of the active SPS for the base layer.

C.5.2.2 Output and Removal of Pictures from the DPB

When the current picture is not picture 0 (i.e., the current picture does not have a POC value of 0) in the current layer, the output and removal of pictures in the current layer from the DPB before the decoding of the current picture, i.e. picture n, but after parsing the slice header of the first slice of the current picture, happens instantaneously when the first decoding unit of the current picture is removed from the CPB and proceeds as follows:

The decoding process for RPS as specified in subclause 8.3.2 is invoked.

If the current picture is an IRAP picture with NoRaslOutputFlag equal to 1, or the base layer picture in the current access unit is an IRAP picture with NoRaslOutputFlag equal to 1 and NoClrasOutputFlag is equal to 1, the following ordered steps are applied:

1. The variable NoOutputOfPriorPicsFlag is derived for the decoder under test as follows:

If the current picture is a CRA picture with NoRaslOutputFlag equal to 1, NoOutputOfPriorPicsFlag is set equal to 1 (regardless of the value of no_output_of_prior_pics_flag).

Otherwise, if the current picture is an IRAP picture with NoRaslOutputFlag equal to 1 and the value of pic_width_in_luma_samples, pic_height_in_luma_samples, or sps_max_dec_pic_buffering_minus 1 [HighestTid] derived from the active SPS for the current layer is different from the value of pic_width_in_luma_samples, pic_height_in_luma_samples, or sps_max_dec_pic_buffering_minus1[HighestTid], respectively, derived from the SPS that was active for the current layer when decoding the preceding picture in the current layer, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, if the current picture is an IRAP picture with NoRaslOutputFlag equal to 1, NoOutputOfPriorPicsFlag is set equal to no_output_of_prior_pics_flag.

Otherwise (the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorPicsFlag is set equal to 1.

2. The value of NoOutputOfPriorPicsFlag derived for the decoder under test is applied for the HRD as follows:

If NoOutputOfPriorPicsFlag is equal to 1, all picture storage buffers in the sub-DPB are emptied without output of the pictures they contain, and the sub-DPB fullness is set equal to 0.

Otherwise (NoOutputOfPriorPicsFlag is equal to 0), all picture storage buffers containing a picture that is marked as "not needed for output" and "unused for reference" are emptied (without output), and all non-empty picture storage buffers in the sub-DPB are emptied by repeatedly invoking the "bumping" process specified in subclause C.5.2.4, and the sub-DPB fullness is set equal to 0.

Otherwise, all picture storage buffers that contain a picture in the current layer and that are marked as "not needed for output" and "unused for reference" are emptied (without the pictures being output). For each picture storage buffer that is emptied, the sub-DPB fullness is decremented by one. When one or more of the following conditions are true, the "bumping" process specified in subclause C.5.2.4 is invoked repeatedly while further decrementing the sub-DPB fullness by one for each additional picture storage buffer that is emptied, until none of the following conditions are true:

The number of access units that contain at least one decoded picture in the DPB marked as "needed for output" is greater than MaxNumReorderPics.

MaxLatencyincreasePlus1 is not equal to 0 and there is at least one access unit that contains at least one decoded picture in the DPB marked as "needed for output" for which the associated variable PicLatencyCount is greater than or equal to MaxLatencyPictures.

The number of pictures in the current layer in the sub-DPB is greater than or equal to MaxDecPicBufferingMinus1+1.

C.5.2.3 Picture decoding, marking, additional bumping, and storage

The processes specified in this subclause happen instantaneously when the last decoding unit of picture n is removed from the CPB.

PicOutputFlag is updated as follows:

If the current access unit does not contain a picture at a target output layer and alt_output_layer_flag is equal to 1, the following ordered steps apply:

The list nonOutputLayerPictures is the list of pictures of the access unit with PicOutputFlag equal to 1 and with nuh_layer_id values that are included in the TargetDecLayerIdList and that are not on target output layers.

The picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in a target output layer is set equal to 0.

When the current picture has PicOutputFlag equal to 1, for each picture in the current layer in the sub-DPB that is marked as "needed for output" and follows the current picture in output order, the associated variable PicLatencyCount is set equal to PicLatencyCount+1.

The current picture is considered as decoded after the last decoding unit of the picture is decoded. The current decoded picture is stored in an empty picture storage buffer in the sub-DPB, and the following applies:

If the current decoded picture has PicOutputFlag equal to 1, it is marked as "needed for output" and its associated variable PicLatencyCount is set equal to 0.

Otherwise (the current decoded picture has PicOutputFlag equal to 0), it is marked as "not needed for output".

The current decoded picture is marked as "used for short-term reference".

When one or more of the following conditions are true, the "bumping" process specified in subclause C.5.2.4 is invoked repeatedly until none of the following conditions are true:

The number of access units that contain at least one decoded picture in the DPB marked as "needed for output" is greater than MaxNumReorderPics.

MaxLatencyIncreasePlus1 is not equal to 0 and there is at least one access unit that contains at least one decoded picture in the DPB marked as "needed for output" for which the associated variable PicLatencyCount is greater than or equal to MaxLatencyPictures.

C.5.2.4 "Bumping" Process

The "bumping" process consists of the following ordered steps:

1. The picture or pictures that are first for output are selected as the ones having the smallest value of PicOrderCntVal of all pictures in the DPB marked as "needed for output".
2. Each of these pictures is, in ascending nuh_layer_id order, cropped, using the conformance cropping window specified in the active SPS for the picture, the cropped picture is output, and the picture is marked as "not needed for output".
3. Each picture storage buffer that contains a picture marked as "unused for reference" and that was one of the pictures cropped and output is emptied.

In accordance with the techniques of this disclosure, video encoder 20 and video decoder 30 may output pictures from a DPB prior to performing POC value resetting. For example, according to aspects of this disclosure, prior to performing POC value resetting for a particular access unit, video encoder 20 and video decoder 30 may be configured to output all pictures stored to the DPB. Video encoder 20 and video decoder 30 may output all pictures stored to the DPB that have been marked as "needed for output" prior to coding an initial picture of the access unit for which POC value resetting is performed. For example, video encoder 20 may perform the outputting process after coding the slice header, but prior to encoding the payload of the slice, deriving POC values and constructing a reference picture list. Likewise, video decoder 30 may perform the outputting process after coding the slice header, but prior to decoding the payload of the slice, derivation of POC values and decoding reference pictures.

In an example for purposes of illustration, a picture currently being coded (encoded or decoded) may be a POC-reset picture (e.g., a picture with a poc_reset_idc syntax element equal to 1 or 2, or a poc_reset_idc syntax element equal to 3 that is the first picture of the current layer in coding order in a POC resetting period). In this example, based on the current picture being a POC-reset picture, video encoder 20 and video decoder 30 may output all existing pictures in the DPB that have not yet been output, excluding picture that belong to the current access unit (e.g., the access unit containing the current picture).

In this manner, according to aspects of this disclosure, video encoder 20 and video decoder 30 may be configured to maintain POC value alignment for pictures stored to the DPB when performing POC value resetting. That is, video encoder 20 and video decoder 30 may be configured to output pictures of the DPB together (rather than access unit by access unit) prior to POC value resetting. Outputting all pictures of the DPB in this way, prior to POC resetting, may help to ensure that pictures of the same temporal instance (in the same access unit and having the same POC values) are output at the same or substantially the same time. In addition, in some instances, outputting all earlier pictures (e.g., pictures stored to the DPB and occurring prior to the picture currently being coded in coding order) is that video encoder 20 and video decoder 30 may be configured having a relatively smaller buffer size than is needed for outputting pictures on an access unit by access unit basis.

An example operation of outputting pictures from a DPB, including picture output, bumping, and removal in accordance with the techniques of this disclosure is set forth below. The process is described relative to e.g., that of MV-HEVC as modified by documents JCTVC-O0217 and JCTVC-O0266 noted above. In the example description, syntax tables and semantics below, additions to MV-HEVC (as modified by documents JCTVC-O0217 and JCTVC-O0266) are represented using italics and deletions are represented using bracketed text preceded by "removed" (e.g., [removed: "removed text"]). In general, statements regarding "requirements" should be understood to form part of the text of the standard or standard extension, and not a requirement for purposes of the techniques of this disclosure. In some instances, such "requirements" may include bitstream constraints that may be determined to be applicable and then adhered to by, for example, a video coder based on the determination).

C.5.2.2 Output and Removal of Pictures from the DPB

When the current picture is not picture 0 in the current layer, the output and removal of pictures in the current layer from the DPB before the decoding of the current picture, i.e. picture n, but after parsing the slice header of the first slice of the current picture and before the invocation of the decoding process for picture order count, happens instantaneously when the first decoding unit of the current picture is removed from the CPB and proceeds as follows:

When poc_reset_idc of the current picture is greater than 0 and the current access unit is the first access unit in a POC resetting period all pictures in the DPB that do not belong to the current access unit and that are marked as "needed for output" are output, starting with pictures with the smallest value of PicOrderCntVal of all pictures excluding those in the current access unit in the DPB, in ascending order of the PicOrderCntVal values, and pictures with the same value of PicOrderCntVal are output in ascending order of the nuh_layer_id values. When a picture is output, it is cropped using the conformance cropping window specified in the active SPS for the picture, the cropped picture is output, and the picture is marked as "not needed for output".

The decoding processes for picture order count and RPS are invoked. When decoding a CVS conforming to one or more of the profiles specified in Annex A using the decoding process specified in clauses 2 through 10, the decoding processes for picture order count and RPS that are invoked are as specified in subclauses 8.3.1 and 8.3.2, respectively. When decoding a CVS conforming to one or more of the profiles specified in Annex G or H using the decoding process specified in Annex F, and Annex G or H, the decoding processes for picture order count and RPS that are invoked are as specified in subclauses Error! Reference source not found. and Error! Reference source not found., respectively.

If the current picture is an IRAP picture with NoRaslOutputFlag equal to 1, or the base layer picture in the current access unit is an IRAP picture with NoRaslOutputFlag equal to 1 and NoClrasOutputFlag is equal to 1, the following ordered steps are applied:

1. The variable NoOutputOfPriorPicsFlag is derived for the decoder under test as follows:

If the current picture is a CRA picture with NoRaslOutputFlag equal to 1, NoOutputOfPriorPicsFlag is set equal to 1 (regardless of the value of no_output_of_prior_pics_flag).

Otherwise, if the current picture is an IRAP picture with NoRaslOutputFlag equal to 1 and the value of pic_width_in_luma_samples, pic_height_in_luma_samples, or sps_max_dec_pic_buffering_minus1 [HighestTid] derived from the active SPS for the current layer is different from the value of pic_width_in_luma_samples, pic_height_in_luma_samples, or sps_max_dec_pic_pic_buffering_minus1[HighestTid], respectively, derived from the SPS that was active for the current layer when decoding the preceding picture in the current layer, NoOutputOfPriorPicsFlag may (but should not) be set to 1 by the decoder under test, regardless of the value of no_output_of_prior_pics_flag.
   NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, if the current picture is an IRAP picture with NoRaslOutputFlag equal to 1, NoOutputOfPriorPicsFlag is set equal to no_output_of_prior_pics_flag.

Otherwise (the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorPicsFlag is set equal to 1.

2. The value of NoOutputOfPriorPicsFlag derived for the decoder under test is applied for the HRD as follows:

IfNoOutputOfPriorPicsFlag is equal to 1, all picture storage buffers in the sub-DPB are emptied without output of the pictures they contain, and the sub-DPB fullness is set equal to 0.

Otherwise (NoOutputOfPriorPicsFlag is equal to 0), all picture storage buffers containing a picture that is marked as "not needed for output" and "unused for reference" are emptied (without output), and all non-empty picture storage buffers in the sub-DPB are emptied by repeatedly invoking the "bumping" process specified in subclause C.5.2.4, and the sub-DPB fullness is set equal to 0.

Otherwise, all picture storage buffers that contain a picture in the current layer and that are marked as "not needed for output" and "unused for reference" are emptied (without output). For each picture storage buffer that is emptied, the sub-DPB fullness is decremented by one. When one or more of the following conditions are true, the "bumping" process specified in subclause C.5.2.4 is invoked repeatedly [Removed: while further decrementing the sub DPB fullness by one for each additional picture storage buffer that is emptied], until none of the following conditions are true:

The number of access units that contain at least one decoded picture in the DPB marked as "needed for output" is greater than MaxNumReorderPics.

MaxLatencyIncreasePlus1 is not equal to 0 and there is at least one access units that contain at least one decoded picture in the DPB marked as "needed for output" for which the associated variable PicLatencyCount is greater than or equal to MaxLatencyPictures.

The number of pictures in the current layer in the sub-DPB is greater than or equal to MaxDecPicBufferingMinus1+1.

C.5.2.3 Picture decoding, marking, additional bumping, and storage

The processes specified in this subclause happen instantaneously when the last decoding unit of picture n is removed from the CPB. [Ed. (MH): This change might not comply with version 1, because version 1 decoders would mark and store the base-layer picture at the CPB removal time of the AU, which can be later than the CPB removal time of the base-layer picture.]

PicOutputFlag is updated as follows:

If the current access unit does not contain a picture at a target output layer and alt_output_layer_flag is equal to 1, the following ordered steps apply:

The list nonOutputLayerPictures is the list of pictures of the access unit with PicOutputFlag equal to 1 and with nuh_layer_id values that are included in the TargetDecLayerIdList and that are not on target output layers.

The picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in a target output layer is set equal to 0.

When the current picture has PicOutputFlag equal to 1, for each picture in the current layer in the sub-DPB that is marked as "needed for output" and follows the current picture in output order, the associated variable PicLatencyCount is set equal to PicLatencyCount+1.

The current picture is considered as decoded after the last decoding unit of the picture is decoded. The current decoded picture is stored in an empty picture storage buffer in the sub-DPB, and the following applies:

If the current decoded picture has PicOutputFlag equal to 1, it is marked as "needed for output" and its associated variable PicLatencyCount is set equal to 0.

Otherwise (the current decoded picture has PicOutputFlag equal to 0), it is marked as "not needed for output".

The current decoded picture is marked as "used for short-term reference".

When one or more of the following conditions are true, the "bumping" process specified in subclause C.5.2.4 is invoked repeatedly until none of the following conditions are true:

The number of access units that contain at least one decoded picture in the DPB marked as "needed for output" is greater than MaxNumReorderPics.

MaxLatencyIncreasePlus1 is not equal to 0 and there is at least one access units that contain at least one decoded picture in the DPB marked as "needed for output" for which the associated variable PicLatencyCount is greater than or equal to MaxLatencyPictures.

C.5.2.4 "Bumping" Process

The "bumping" process consists of the following ordered steps:

1. The picture or pictures that are first for output are selected as the ones having the smallest value of PicOrderCntVal of all pictures in the DPB marked as "needed for output".
2. Each of these pictures is, in ascending nuh_layer_id order, cropped, using the conformance cropping window specified in the active SPS for the picture, the cropped picture is output, and the picture is marked as "not needed for output".

Each picture storage buffer that contains a picture marked as "unused for reference" and that was one of the pictures cropped and output is emptied and the fullness of the associated sub-DPB is decremented by one.

Hence, in the example above and according to aspects of this disclosure, video encoder 20 and video decoder 30 may be configured to, based on data that indicates a POC reset for a POC value of a picture of a first received layer of multi-layer video data (e.g., the poc_reset_idc syntax element), output pictures of the DPB together (rather than access unit by access unit) prior to POC value resetting. Outputting all pictures of the DPB in this way, prior to POC resetting, may help to ensure that pictures of the same temporal instance (in the same access unit and having the same POC values) are output at the same or substantially the same time.

As noted above, a layer-specific POC resetting period may be specified based on a POC resetting period identifier signaled in slice segment headers. That is, video encoder 20 and video decoder 30 may respectively code data representative of the POC resetting period identifier in slice segment headers. Each non-IRAP picture that belongs to an access unit that contains at least one IRAP picture may be the start of a POC resetting period in the layer containing the non-IRAP picture. That is, video encoder 20 may set a POC resetting type for a non-IRAP picture of an access unit containing at least one IRAP picture to indicate that the non-IRAP picture is the start of a new POC resetting period. In such an access unit, each picture would be the start of a POC resetting period in the layer containing the picture. POC resetting, either POC MSB only or both POC MSB and POC LSB, and update of POC values of same-layer pictures in the DPB may be applied only for the first picture within each POC resetting period.

Video encoder 20 may signal a POC LSB value in a slice segment header that video decoder 30 may use to derive POC values of pictures in a layer including the slice having the slice segment header. The POC LSB value signaled in the slice segment header may be used for derivation of the delta POC value, which is used for updating the POC values of the same-layer pictures in the DPB, and also for derivation of the POC MSB of the POC value of the current picture. When the current picture has such a POC LSB value signaled, and when the POC-anchor picture associated with the current picture is present in the bitstream, the POC-anchor picture has an indication of either POC resetting or POC MSB resetting. Such a POC LSB value signaled for the current picture is equal to the POC LSB value of the POC-anchor picture, which is also the first picture of the POC resetting period as the current picture.

As noted above, video encoder 20 and video decoder 30 may derive a POC MSB value based on a POC MSB value of the picture occurring prior to the current picture in coding order. For example, video decoder 30 may determine the MSB POC value for a current picture (a picture currently being decoded) based on the NAL unit type of the current picture and the MSB and LSB of the previous picture in decoding order that is not of NAL unit type random access skipped leading (RASL) or random access decodable leading (RADL), or not a sub-layer non-reference picture, and that has a temporal_id value that is equal to 0. When the current picture is an IRAP picture with NoRaslOutputFlag equal to 1, or a CRA picture that is the first picture of the bitstream, the value of POC MSB may be inferred (i.e., determined by video decoder 30) to be equal to 0.

According to aspects of this disclosure, video encoder 20 and video decoder 30 may be configured to determine a picture type of a picture being coded and, based on the picture type, code (encode or decode) data indicating a POC MSB value for the picture being coded. More particularly, the video coder may selectively code the data indicating the POC MSB value, based on the picture type. For instance, there may generally be a set of picture types for which POC MSB values are coded and another set of picture types for which POC MSB values are not coded. The video coder may code the POC MSB value for a picture only when a picture type for the picture is included in the set of picture types for which POC MSB values are coded. In this manner, video encoder 20 may indicate and video decoder 30 may determine the POC MSB value for the picture being coded without referencing a POC MSB of another picture in the multi-layer bitstream. Indicating and determining the POC MSB in this way may improve error resilience in instances in which a relatively large number of POC values separate the picture being coded from a picture that precedes the picture being decoded in coding order (e.g., as may occur with up-switching or down-switching of the multi-layer bitstream). In the case that the picture type of a current picture is included in the set of picture types for which POC MSB values are not coded, the video coder may use a POC MSB value of a previously decoded picture to determine the POC MSB value for the current picture.

Again, the following disclosure and tables include example syntax in accordance with the techniques of this disclosure. The syntax may be modified relative to, e.g., that of MV-HEVC as modified by documents JCTVC-O0217 and JCTVC-O0266 noted above. In the example description, syntax tables and semantics below, additions to MV-HEVC (as modified by documents JCTVC-O0217 and JCTVC-O0266) are represented using italics and deletions are represented using bracketed text preceded by "removed" (e.g., [removed: "removed text"]). In general, statements regarding "requirements" should be understood to form part of the text of the standard or standard extension, and not a requirement for purposes of the techniques of this disclosure. In some instances, such "requirements" may include bitstream constraints that may be determined to be applicable and then adhered to by, for example, a video coder based on the determination).

The following definition of a mathematical function may be added to MV-HEVC, e.g., to subclause 5.8 of MV-HEVC:

$$GetCurrMsb(cl, pl, pm, ml) = \begin{cases} pm + ml; & pl - cl >= ml/2 \\ pm - ml; & cl - pl > ml/2 \\ pm; & \text{otherwise} \end{cases}$$

The following additional syntax function is added:
more_data_in_slice_segment_header_extension( ) is specified as follows:
- If (the current position in the slice_segment_header( ) syntax structure)-(the position immediately following slice_segment_header_extension_length) is less than (slice_segment_header_extension_length*8), the return value of more_data_in_slice_segment_header_ extension( ) is equal to TRUE.
- Otherwise, the return value of more_data_in_slice_segment_header_extension( ) is equal to FALSE.

The following definition may be added to sub-clause F.3:
F.3.1 picture order count (POC) resetting period: A sequence of access units in decoding order that all have poc_reset_idc greater than 0 and the same value of poc_reset_period_id, which may or may not be interleaved with access units that have poc_reset_idc equal to 0.

In one alternative, pictures in a POC resetting period are required to be continuous in decoding order within a layer. However, allowing these pictures to be interleaved with pictures with poc_reset_idc equal to 0 in the same layer is more flexible and allows using the same overhead to achieve better error resilience for clustered packet losses.

The following table is an example of syntax for a PPS in accordance with the techniques of this disclosure:

| pic_parameter_set_rbsp( ) { | Descriptor |
|---|---|
| ... | |
|   pps_extension_flag | u(1) |
|   if( pps_extension_flag ) { | |
|     poc_reset_info_present_flag | u(1) |
|     pps_extension2_flag | u(1) |
|     if( pps_extension2_flag ) | |
|       while( more_rbsp_data( ) ) | |
|         pps_extension_data_flag | u(1) |
|   } | |
|   rbsp_trailing_bits( ) | |
| } | |

In the example above, pps_extension_flag equal to 0 specifies that no pps_extension_data_flag syntax elements are present in the PPS RBSP syntax structure. When slice_segment_header_extension_present_flag is equal to 0, pps_extension_flag shall be equal to 0 in bit streams conforming to this version of this Specification, the value of 1 for pps_extension_flag is reserved for future use by ITU-T|ISO/IEC, and decoders shall ignore all data that follow the value 1 for pps_extension_flag in a PPS NAL unit.

In addition, poc_reset_info_present_flag equal to 0 specifies that the syntax element poc_reset_idc is not present in the slice segment headers of the slices referring to the PPS. In addition, poc_reset_info_present_flag equal to 1 specifies that the syntax element poc_reset_idc is present in the slice segment headers of the slices referring to the PPS.

In addition, pps_extension2_flag equal to 0 specifies that no pps_extension_data_flag syntax elements are present in the PPS RBSP syntax structure. pps_extension2_flag shall be equal to 0 in bit streams conforming to this version of this Specification. The value of 1 for pps_extension2_flag is reserved for future use by ITU-T|ISO/IEC. Decoders shall ignore all data that follow the value 1 for pps_extension2_flag in a PPS NAL unit.

The following table is an example of syntax for a slice header in accordance with the techniques of this disclosure:

| slice_segment_header( ) { | Descriptor |
|---|---|
| ... | |
|   if( !dependent_slice_segment_flag ) { | |
|     i = 0 | |
|     if( num_extra_slice_header_bits > i ) { | |
|       i++ | |
|       discardable_flag | u(1) |
|     } | |
|     if( num_extra_slice_header_bits > i ) { | |
|       i++ | |
|       cross_layer_bla_flag | u(1) |
|     } | |
|     if( num_extra_slice_header_bits > i ) { | |
|       i++ | |
|       poc_reset_flag | u(1) |
|     } | |
|   ... | |
|   if( slice_segment_header_extension_present_flag ) { | |
|     slice_segment_header_extension_length | ue(v) |
|     if( poc_reset_info_present_flag ) | |
|       poc_reset_idc | u(2) |

| slice_segment_header( ) { | Descriptor |
|---|---|
|   if( poc_reset_idc > 0 ) | |
|     poc_reset_period_id | u(6) |
|   if( poc_reset_idc = = 3 ) { | |
|     full_poc_reset_flag | u(1) |
|     poc_lsb_val | u(v) |
|   } | |
|   if( nal_unit_type = = BLA_W_LP \|\| nal_unit_type = = BLA_N_LP \|\| | |
|       nal_unit_type = = BLA_W_RADL \|\| nal_unit_type = = CRA_NUT ) | |
|     poc_msb_val | ue(v) |
|   while( more_data_in_slice_segment_header_extension( ) ) | |
|     slice_segment_header_extension_data_bit | u(1) |
|   } | |
|   byte_alignment( ) | |
| } | |

Alternatively, the poc_reset_period_id syntax element may be signaled using a different number of bits, e.g. coded as u(14).

When present, the value of the slice segment header syntax elements slice_pic_parameter_set_id, pic_output_flag, no_output_of_prior_pics_flag, slice_pic_order_cnt_lsb, short_term_ref pic_set_sps_flag, short_term_ref_pic_set_idx, num_long_term_sps, num_long_term_pics, slice_temporal_mvp_enabled_flag, discardable_flag, cross_layer_bla_flag, inter_layer_pred_enabled_flag, num_inter_layer ref_pics_minus1, poc_reset_idc, poc_reset_pic_id, full_poc_reset_flag, and poc_lsb_val and poc_msb_val shall be the same in all slice segment headers of a coded picture. When present, the value of the slice segment header syntax elements lt_idx_sps[i], poc_lsb_lt[i], used_by_curr_pic_lt_flag[i], delta_poc_msb_present_flag[i], delta_poc_msb_cycle_t[i], and inter_layer_pred_layer_idc[i] shall be the same in all slice segment headers of a coded picture for each possible value of i.

The syntax element poc_reset_idc equal to 0 specifies that neither the most significant bits nor the least significant bits of the picture order count value for the current picture are reset. The syntax element poc_reset_idc equal to 1 specifies that only the most significant bits of the picture order count value for the current picture may be reset. The syntax element poc_reset_idc equal to 2 specifies that both the most significant bits and the least significant bits of the picture order count value for the current picture may be reset. The syntax element poc_reset_idc equal to 3 specifies that either only the most significant bits or both the most significant bits and the least significant bits of the picture order count value for the current picture may be reset and additional picture order count information is signaled. When not present, the value of the syntax element poc_reset_poc is inferred (i.e., determined, by a coder, without explicit signaling) to be equal to 0.

It is a requirement of bitstream conformance that the following constraints apply:
The value of poc_reset_idc shall not be equal to 1 or 2 for a RASL picture, a RADL picture, a sub-layer non-reference picture, or a picture that has TemporalId greater than 0 or discardable_flag equal to 1.
The value of poc_reset_idc of all pictures in an access unit shall be the same.
When one picture in an access unit is an IRAP picture with a particular value of nal_unit_type and there is at least one other picture in the same access unit with a different value of nal_unit_type, the value of poc_reset_idc shall be equal to 1 or 2 for all pictures in the access unit.
When the picture with nuh_layer_id equal to 0 in an access unit is an IDR picture and there is at least one non-IDR picture in the same access unit, the value of poc_reset_idc shall be equal to 2 for all pictures in the access unit.
When the picture with nuh_layer_id equal to 0 in an access unit is not an IDR picture, the value of poc_reset_idc shall not be equal to 2 for any picture in the access unit.

The value of poc_reset_idc of an access unit refers to the value of poc_reset_idc of the pictures in the access unit.

The syntax element poc_reset_period_id identifies a POC resetting period. There shall be no two pictures consecutive in decoding order in the same layer that have the same value of the syntax element poc_reset_period_id and the syntax element poc_reset_idc equal to 1 or 2.
NOTE—It is not prohibited for multiple pictures in a layer to have the same value of poc_reset_pic_id and to have poc_reset_idc equal to 1 or 2 unless such pictures occur in two consecutive access units in decoding order. To minimize the likelihood of such two pictures appearing in the bitstream due to picture losses, bitstream extraction, seeking, or splicing operations, encoders should set the value of poc_reset_pic_id to be a random value for each POC resetting period (subject to the constraints specified above).

It is a requirement of bitstream conformance that the following constraints apply:
One POC resetting period shall not include more than one access unit with poc_reset_idc equal to 1 or 2.
An access unit with poc_reset_idc equal to 1 or 2 shall be the first access unit in a POC resetting period.

The syntax element full_poc_reset_flag equal to 1 specifies that both the most significant bits and the least significant bits of the picture order count value for the current picture are reset when the previous picture in decoding order in the same layer does not belong to the same POC resetting period. The syntax element full_poc_reset_flag equal to 0 specifies that only the most significant bits of the picture order count value for the current picture are reset when the previous picture in decoding order in the same layer does not belong to the same POC resetting period.

The syntax element poc_lsb_val specifies a value that may be used to derive the picture order count of the current picture. The length of the poc_lsb_val syntax element is log 2_max_pic_order_cnt_lsb_minus4+4 bits.

It is a requirement of bitstream conformance that, when poc_reset_idc is equal to 3, and the previous picture picA in decoding order that is in the same layer as the current picture, has poc_reset_idc equal to 1 or 2, and belongs to the same POC resetting period is present in the bitstream, picA shall be the same picture as the previous picture in decoding order that is in the same layer as the current picture, that is not a RASL picture, a RADL picture or a sub-layer non-reference picture, and that has TemporalId equal to 0 and discardable_flag equal to 0, and the value of poc_lsb_val of the current picture shall be equal to the value of slice_pic_order_cnt_lsb of picA.

The syntax element poc_msb_val specifies a value that is used to derive picture order count values when the current picture is a CRA picture with NoRaslOutputFlag equal to 0. The value of poc_msb_val shall be in the range of 0 to 232−log 2_max_pic_order_cnt_lsb_minus4−4, inclusive.

Here, according to aspects of this disclosure, video decoder 30 may determine a picture type of a picture currently being decoded. If the NAL unit type of the picture is CRA or BLA (e.g., as set forth in the "if nal_unit_type . . ." statement in the example slice segment header table above), video decoder 30 may decode data indicating the POC MSB value of the picture currently being decoded (e.g., the poc_msb_val syntax element). While reference is made to particular picture types (BLA and CRA) and syntax elements (poc_msb_val) in this example, it should be understood that the techniques are not limited in this way. That is, video decoder 30 may decode a variety of other syntax elements indicating a POC MSB value based on the picture type currently being decoded being a variety of other picture types.

Video decoder 30 may perform the following decoding process for starting the decoding of a coded picture with nuh_layer_id greater than 0. Each "picture" referred to in the process below is a complete coded picture. The decoding process operates as follows for the current picture CurrPic:
Decode NAL units as described herein.
The processes in subclause F.8.3 specify the following decoding processes using syntax elements in the slice segment layer and above:
Variables and functions relating to picture order count are derived in subclause F.8.3.1. This needs to be invoked only for the first slice segment of a picture. It is a requirement of bitstream conformance that PicOrderCntVal shall remain unchanged within an access unit.
The decoding process for RPS in subclause F.8.3.2 is invoked, wherein only reference pictures with a nuh_layer_id equal to that of CurrPic may be marked as "unused for reference" or "used for long-term reference" and any picture with a different value of nuh_layer_id is not marked. This needs to be invoked only for the first slice segment of a picture.
When FirstPicInLayerDecodedFlag[nuh_layer_id] is equal to 0, the decoding process for generating unavailable reference pictures specified in subclause F.8.1.3 is invoked, which needs to be invoked only for the first slice segment of a picture.
When FirstPicInLayerDecodedFlag[nuh_layer_id] is not equal to 0 and the current picture is an IRAP picture with NoRaslOutputFlag equal to 1, the decoding process for generating unavailable reference pictures specified in subclause F.8.1.3 is invoked, which needs to be invoked only for the first slice segment of a picture.

According to aspects of this disclosure, video decoder 30 may perform the following decoding process for POC values:
Output of this process is PicOrderCntVal, the picture order count of the current picture.
Picture order counts are used to identify pictures, for deriving motion parameters in merge mode and motion vector prediction, and for decoder conformance checking (see subclause C.5).
Each coded picture is associated with a picture order count variable, denoted as PicOrderCntVal.
If FirstPicInLayerDecodedFlag[nuh_layer_id] is equal to 1, poc_reset_idc is greater than 0, and the current picture is the first picture in decoding order in a POC resetting period for the current layer, the following applies:
The variables pocMsbDelta, pocLsbDelta and DeltaPocVal are derived as follows:

```
if( poc_reset_idc = = 3 )
    pocLsbVal = poc_lsb_val
else
    pocLsbVal = slice_pic_order_cnt_lsb
if( the current picture is a CRA picture with NoRaslOutputFlag equal to 0)
    pocMsbDelta = poc_msb_val * MaxPicOrderCntLsb
else {
    prevPicOrderCntLsb =
PrevPicOrderCnt[ nuh_layer_id ] & ( MaxPicOrderCntLsb − 1 )
    prevPicOrderCntMsb =
PrevPicOrderCnt[ nuh_layer_id ] − prevPicOrderCntLsb
    pocMsbDelta = getCurrMsb( pocLsbVal, prevPicOrderCntLsb,
prevPicOrderCntMsb, MaxPicOrderCntLsb )
}
if( poc_reset_idc = = 2 | | ( poc_reset_idc = = 3 &&
full_poc_reset_flag ) )
    pocLsbDelta = pocLsbVal
else
    pocLsbDelta = 0
DeltaPocVal = pocMsbDelta + pocLsbDelta
```

The PicOrderCntVal of each picture that is in the DPB and belongs to the same layer as the current picture is decremented by DeltaPocVal.
The PicOrderCntVal of the current picture is derived as follows:

```
if( poc_reset_idc = = 1 )
    PicOrderCntVal = slice_pic_order_cnt_lsb
else if( poc_reset_idc = = 2 )
    PicOrderCntVal = 0
else { // poc_reset_idc = = 3
    PicOrderCntMsb = getCurrMsb( slice_pic_order_cnt_lsb,
poc_lsb_val, 0, MaxPicOrderCntLsb )
    PicOrderCntVal = PicOrderCntMsb + slice_pic_order_cnt_lsb
}
```

The value of PrevPicOrderCnt[nuh_layer_id] is derived as follows:
If the current picture is not a RASL picture, a RADL picture, or a sub-layer non-reference picture, and the current picture has TemporalId equal to 0 and discardable_flag equal to 0, PrevPicOrderCnt[nuh_layer_id] is set equal to PicOrderCntVal.
Otherwise when poc_reset_idc is equal to 3, PrevPicOrderCnt[nuh_layer_id] is set equal to full_poc_reset_flag ?0: poc_lsb_val.
Otherwise, the following applies:
The PicOrderCntVal of the current picture is derived as follows:

```
if( !FirstPicInLayerDecodedFlag[ nuh_layer_id ] ) {
    if( poc_reset_idc = = 1 )
        PicOrderCntVal = slice_pic_order_cut_lsb
    else if( poc_reset_idc = = 2 )
        PicOrderCntVal = 0
    else if( poc_reset_idc = = 3 ) {
        PicOrderCntMsb = getCurrMsb(slice_pic_order_cut_lsb,
poc_lsb_val, 0, MaxPicOrderCntLsb )
        PicOrderCntVal = PicOrderCntMsb + slice_pic_order_cut_lsb
    } else // the current picture is an IRAP picture with
NoRaslOutputFlag equal to 1
        PicOrderCntVal = slice_pic_order_cnt_lsb
} else { // the POC derivation as in HEVC version 1
    if( the current picture is an IRAP picture with NoRaslOutputFlag
        equal to 1 )
        PicOrderCntMsb = 0
    else if( the current picture is a CRA picture )
        PicOrderCntMsb = poc_msb_val * MaxPicOrderCntLsb
    else {
        prevPicOrderCntLsb =
PrevPicOrderCnt[ nuh_layer_id ] & ( MaxPicOrderCntLsb − 1 )
        prevPicOrderCntMsb =
PrevPicOrderCnt[ nuh_layer_id ] − prevPicOrderCntLsb
        PicOrderCntMsb = getCurrMsb( slice_pic_order_cut_lsb,
prevPicOrderCntLsb,
            prevPicOrderCntMsb, MaxPicOrderCntLsb )
    }
    PicOrderCntVal = PicOrderCntMsb + slice_pic_order_cut_lsb
}
```

The value of PrevPicOrderCnt[nuh_layer_id] is derived as follows:

If the current picture is not a RASL picture, a RADL picture, or a sub-layer non-reference picture, and the current picture has TemporalId equal to 0 and discardable_flag equal to 0, PrevPicOrderCnt[nuh_layer_id] is set equal to PicOrderCntVal.

Otherwise when FirstPicInLayerDecodedFlag [nuh_layer_id] is equal to 0 and poc_reset_idc is equal to 3, PrevPicOrderCnt[nuh_layer_id] is set equal to full_poc_reset_flag ?0: poc_lsb_val.

The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as follows:
PicOrderCnt(picX)=PicOrderCntVal of the picture picX (F-25)

The function DiffPicOrderCnt(picA, picB) is specified as follows:
DiffPicOrderCnt(picA, picB)=PicOrderCnt(picA)−PicOrderCnt(picB)(F-26)

The bitstream shall not contain data that result in values of DiffPicOrderCnt(picA, picB) used in the decoding process that are not in the range of $-2^{15}$ to $2^{15}-1$, inclusive.

NOTE—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

In this manner, video encoder 20 and video decoder 30 represent examples of video coders configured to code a first picture of multi-layer video data, where the first picture has a first picture type, and, based on the first picture having the first picture type, code data representative of a POC MSB value for the first picture. Video encoder 20 and video decoder 30 may also be configured to, according to aspects of this disclosure, code data that indicates a POC reset for a POC value of a first picture of a first received layer of multi-layer video data, where the first picture is included in an access unit, and, based on the data that indicates the POC reset for the POC value of the first picture and prior to decoding the first picture, output all pictures stored in a DPB that precede the first picture in coding order and that are not included in the access unit.

Figure 2:
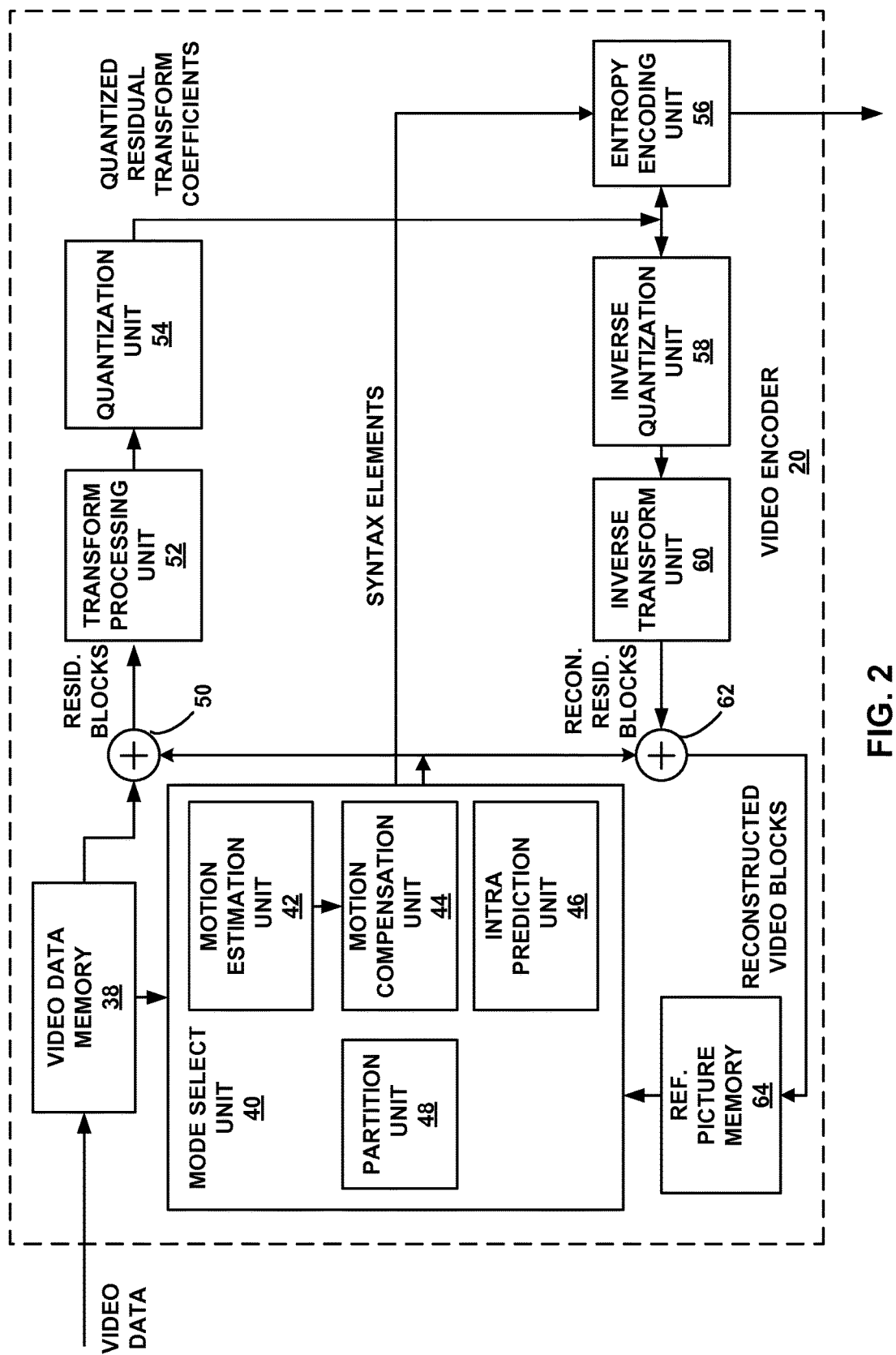
FIG. 2 is a block diagram illustrating an example of a video encoder that may implement techniques for coding POC value information according to the techniques of this disclosure.

FIG. 2 is a block diagram illustrating an example of video encoder 20 that may implement techniques for managing POC values according to the techniques of this disclosure. In particular, video encoder 20 may be configured to manage POC values of pictures of a multi-layer bitstream according to techniques of this disclosure. As noted above, video encoder 20 may be adapted to perform multiview and/or scalable video coding. For example, video encoder 20 may be configured to encode a bitstream that conforms to one or more video coding standard extensions, such as SHVC, MV-HEVC, or 3D-HEVC. However, while reference is made to specific coding standards, it should be understood that the techniques are not specific to any one coding standard, and may be implemented with future and/or not yet developed standards.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a DPB that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being encoded within the current slice (or other coded unit). A predictive block is a block that is found to closely match the block to be encoded, in terms of pixel difference, which may be determined by sum of absolute difference (SAD), sum of square difference (SSD), or other difference metrics.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being encoded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Motion estimation unit 42 searches reference pictures stored in a DPB of reference picture memory 64. Mode select unit 40 may determine which reference pictures are to be used to encode a picture, slice of picture, and/or a sequence of pictures. Video encoder 20 may encode picture order count (POC) values for reference pictures used to encode the picture, slice, or sequence. Video encoder 20 may encode the POC values indicative of the reference pictures to be included in the reference picture list in slice headers and/or parameter sets, such as PPSs and/or SPSs.

In this manner, a video decoder, such as video decoder 30, may reproduce the reference picture list by including the reference pictures indicated in the slice header and/or parameter set(s). Furthermore, after encoding a block using a motion vector produced by motion estimation unit 42, video encoder 20 may encode motion information for the block, where the motion information may include data representative of the motion vector, an identifier for the reference picture list, and a reference index that identifies a reference picture in the reference picture list.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Video encoder 20 may also form POC resetting periods and encode values for POC resetting period identifiers for slices of pictures to assign the slices to respective POC resetting periods. Video encoder 20 may assign slices to POC resetting periods individually within each layer of video data. Moreover, video encoder 20 may determine POC resetting types for the slices and encode values for indications (e.g., two-bit values) of the POC resetting types for the slices.

As discussed with respect to FIG. 1, video encoder 20 may be configured according to restrictions established by an applicable video coding standard. For example, video encoder 20 may ensure that the first picture in each POC resetting period has a POC resetting type indicating that POC values are to be fully or partially reset. Furthermore, video encoder 20 may encode additional information indicative of a POC LSB value in some examples, which may indicate a POC LSB value for a POC anchor picture of the POC resetting period.

In general, as described above, video encoder 20 may determine a POC MSB value for a current picture based on the POC MSB value of the POC MSB value of the picture coded prior to the current picture in cording order. According to aspects of this disclosure, video encoder 20 may also encode information indicating a POC MSB value for certain pictures of a bitstream. For example, according to aspects of this disclosure, video encoder 20 may encode data indicating a POC MSB value for pictures having a particular picture type. In some examples, video encoder 20 may be configured to encode data a POC MSB value for pictures having a CRA or BLA picture type, based on the pictures having the CRA or BLA picture type. That is, in such examples, video encoder 20 may encode a POC MSB value only for a first set of picture types that include the CRA and BLA picture types. Video encoder 20 may not encode the POC MSB value for other picture types, instead determining the POC MSB value based on a previously encoded picture to the current picture.

In some instances, video encoder 20 may encode data indicating a POC MSB value for pictures other than pictures having the designated picture types described above. For example, in some instances, video encoder 20 may encode data indicating a POC MSB value for any picture for which POC value resetting is performed.

Video encoder 20 may also manage the bumping and output process of reference pictures in the DPB of reference picture memory 64. According to aspects of this disclosure, video encoder 20 may be configured output pictures from a DPB of reference picture memory 64 prior to performing POC value resetting. For example, according to aspects of this disclosure, prior to performing POC value resetting for a particular access unit, video encoder 20 may be configured to output all pictures stored to the DPB of reference picture memory that have been marked as "needed for output." In some instances, video encoder 20 may perform the outputting process after encoding a slice header for an initial picture of an access unit, but prior to deriving POC values and constructing a reference picture list. For example, video encoder 20 may perform the outputting process after encoding the slice header for an initial picture of an access unit, but before encoding the payload of the slice (e.g., the video data of the slice).

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to encode a first picture of multi-layer video data, where the first picture has a first picture type, and, based on the first picture having the first picture type, encode data representative of a POC MSB value for the first picture. Video encoder 20 may also be configured to, according to aspects of this disclosure, encode data that indicates a POC reset for a POC value of a first picture of a first received layer of multi-layer video data, where the first picture is included in an access unit, and, based on the data that indicates the POC reset for the POC value of the first picture and prior to encoding the first picture, output all pictures stored in a DPB that precede the first picture in coding order and that are not included in the access unit.

Figure 3:
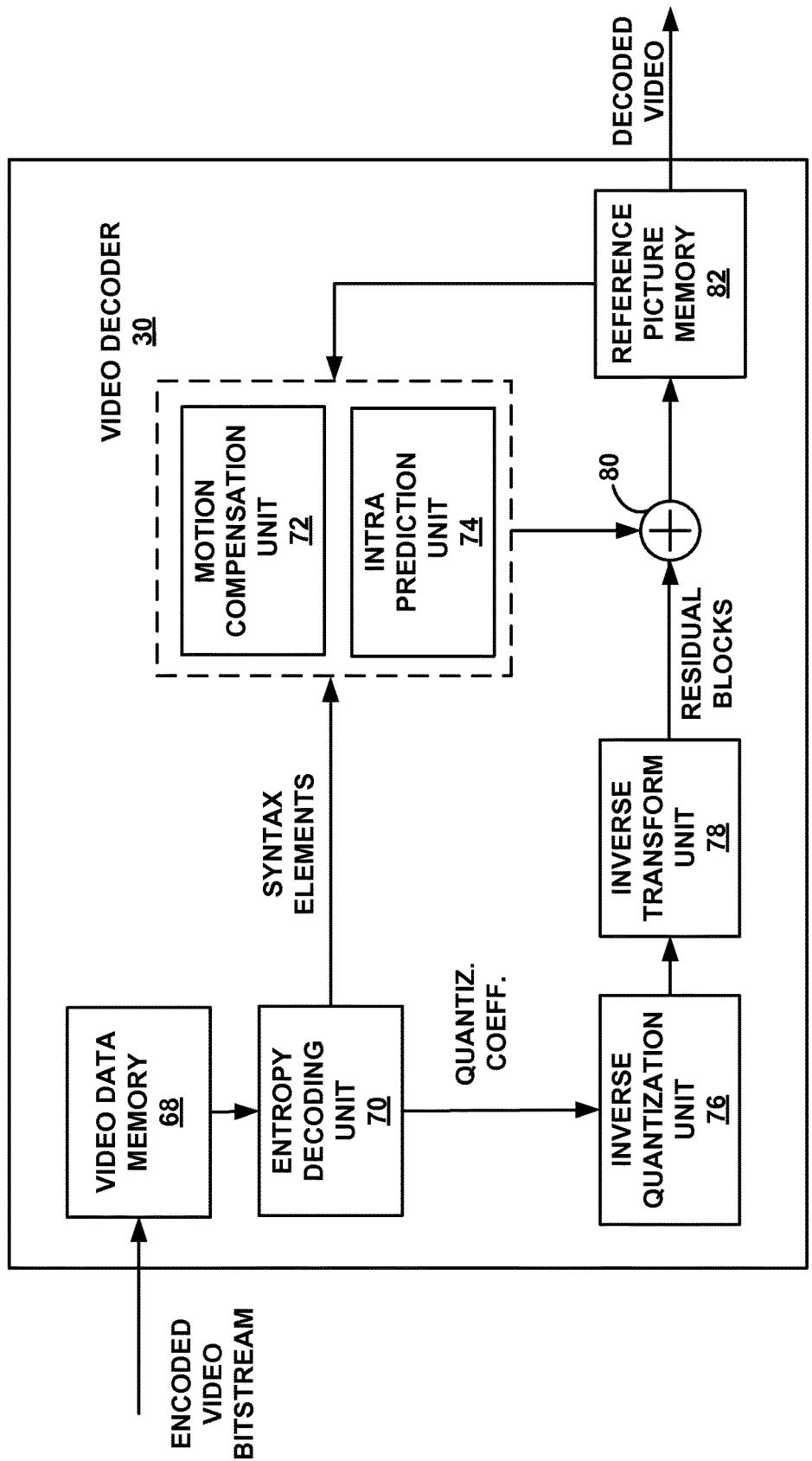
FIG. 3 is a block diagram illustrating an example of a video decoder that may implement techniques for coding POC value information according to the techniques of this disclosure.

FIG. 3 is a block diagram illustrating an example of video decoder 30 that may implement techniques for managing POC values according to the techniques of this disclosure. As noted above, video decoder 30 may be adapted to perform multiview and/or scalable video coding. For example, video decoder 30 may be configured to decode a bitstream that conforms to one or more video coding standard extensions, such as SHVC, MV-HEVC, or 3D-HEVC. However, while reference is made to specific coding standards, it should be understood that the techniques are not specific to any one coding standard, and may be implemented with future and/or not yet developed standards.

In the example of FIG. 3, video decoder 30 includes video data memory 68, an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 68 may store video data, such as an encoded video bitstream, to be decoded by the components of video decoder 30. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a DPB that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (1) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in a DPB of reference picture memory 82.

More particularly, video decoder 30 may decode a PPS indicating whether slices of a picture corresponding to the PPS include POC resetting information. Assuming the slices include the POC resetting information, video decoder 30 may decode a slice segment header of a slice of the picture including the POC resetting information. The POC resetting information may include a POC resetting period identifier and a POC resetting type.

The POC resetting period identifier may indicate a POC resetting period to which the slice corresponds. The POC resetting type may indicate whether the POC value of a picture including the slice is fully reset or that only the MSB of the POC value are reset. Furthermore, the POC resetting type may indicate that no POC reset is to be performed or that additional information is signaled. If the POC resetting type indicates that additional information is signaled, video decoder 30 may decode the additional information, which may indicate a POC LSB value and whether the POC value is fully reset or only MSB are reset.

According to aspects of this disclosure, video decoder 30 may output pictures from a decoded picture buffer based on information indicating a POC reset. For example, video decoder 30 may be configured output pictures from a DPB of reference picture memory 84 prior to performing POC value resetting. That is, according to aspects of this disclosure, prior to performing POC value resetting for a particular access unit, video decoder 30 may be configured to output all pictures stored to the DPB of reference picture memory that have been marked as "needed for output." In some instances, video decoder 30 may perform the outputting process after decoding a slice header for an initial picture of an access unit, but prior to deriving POC values and constructing a reference picture list. For example, video decoder 30 may perform the outputting process after decoding the slice header for an initial picture of an access unit, but before decoding the payload of the slice (e.g., the video data of the slice).

In general, video decoder 30 may determine a POC LSB value for a picture currently being decoded based on data received in a slice header of a slice of the current picture. Video decoder 30 may determine a POC MSB value for a current picture based on the POC MSB value of the POC MSB value of the picture coded prior to the current picture in cording order.

According to aspects of this disclosure, in some instances, video decoder 30 may decode data indicating a POC MSB value from an encoded bitstream for certain pictures of the bitstream. For example, according to aspects of this disclosure, video decoder 30 may determine a picture type for a picture currently being decoded. Based on the picture type, video decoder 30 may decode data indicating the POC MSB value for the picture, rather than determining the POC MSB value for the picture based on the POC MSB value of the picture coded prior to the current picture in decoding order.

In some instances, video decoder 30 may decode data indicating the POC MSB value for the current picture based on the picture type being a CRA or BLA picture type. For example, video decoder 30 may decode a POC MSB value only for a first set of picture types that include the CRA and BLA picture types. Video decoder 30 may not decode the POC MSB value for other picture types, instead determining the POC MSB value based on a previously encoded picture to the current picture. In other examples, video decoder 30 may additionally or alternatively decode data indicating the POC MSB value for other pictures and picture types. For example, according to aspects of this disclosure, video decoder 30 may decode data indicating a POC MSB value for any picture for which POC value resetting is performed.

Video decoder 30 may also decode POC values of reference pictures to be included in a reference picture list. Video decoder 30 may decode these POC values in the slice segment headers and/or from parameter sets, such as a PPS or an SPS. Video decoder 30 may then construct a reference picture list including the reference pictures identified by the decoded POC values.

After constructing the reference picture list for a slice, video decoder 30 may decode blocks of the slice. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), motion vectors for each inter-encoded video block of the slice, inter-prediction status for each inter-coded video block of the slice, and other information to decode the video blocks in the current video slice. Motion information for an inter-predicted block may include a reference picture list identifier and a reference index to identify a reference picture in the reference picture list to use to predict the block.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to decode a first picture of multi-layer video data, where the first picture has a first picture type, and, based on the first picture having the first picture type, code data representative of a POC MSB value for the first picture. Video decoder 30 may also be configured to, according to aspects of this disclosure, decode data that indicates a POC reset for a POC value of a first picture of a first received layer of multi-layer video data, where the first picture is included in an access unit, and, based on the data that indicates the POC reset for the POC value of the first picture and prior to decoding the first picture, output all pictures stored in a DPB that precede the first picture in coding order and that are not included in the access unit.

Figure 4:
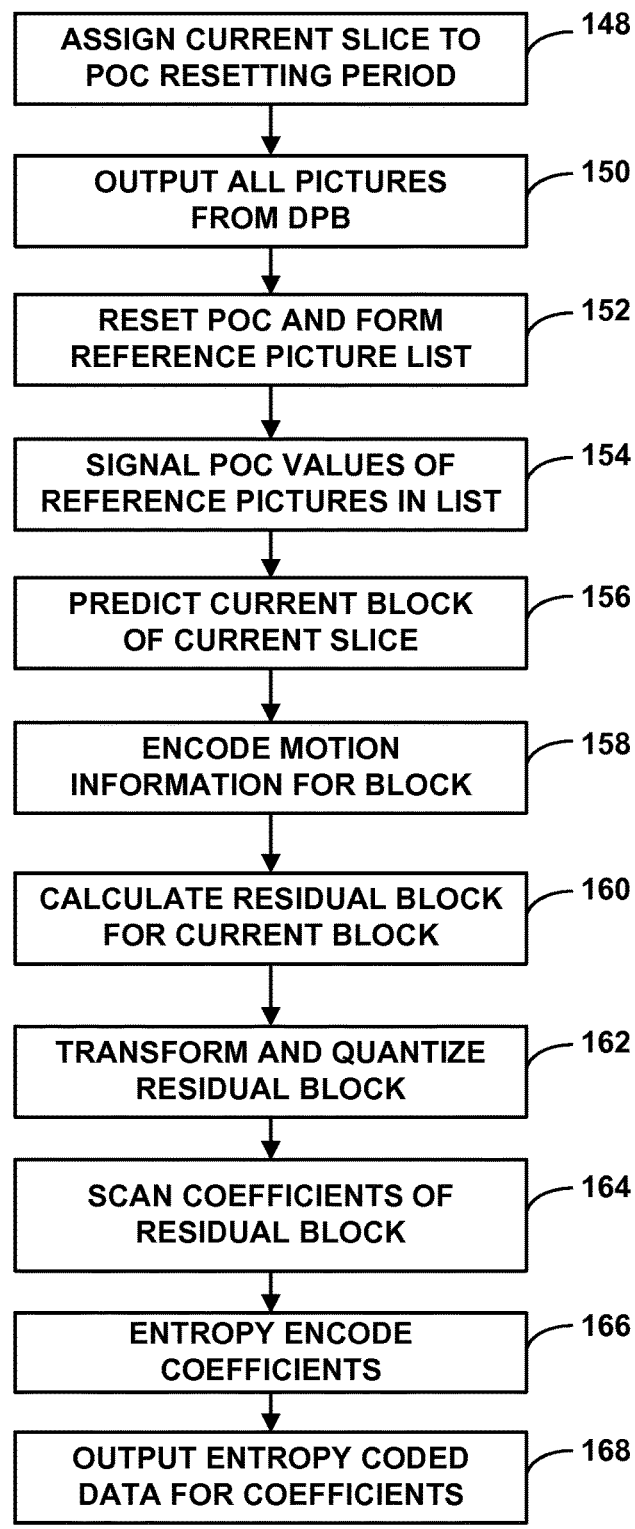
FIG. 4 is a flowchart illustrating an example method for encoding data including outputting pictures of a DPB prior to performing a POC value reset in accordance with the techniques of this disclosure.

FIG. 4 is a flowchart illustrating an example method for encoding data including outputting pictures of a DPB prior to performing a POC value reset in accordance with the techniques of this disclosure. In addition, the method of FIG. 4 includes encoding a current block. The current block may comprise a current CU or a portion of the current CU. Although described with respect to video encoder 20 (FIGS. 1 and 2), it should be understood that other devices may be configured to perform a method similar to that of FIG. 4.

In this example, video encoder 20 may assign the current slice to a POC resetting period (148). For example, if the current slice forms part of an anchor picture, video encoder 20 may signal that the current slice forms the beginning of a new POC resetting period with a POC resetting period identifier that is different from previous POC resetting period identifiers. Alternatively, if the current slice does not form part of an anchor picture, video encoder 20 may signal that the current slice forms part of an existing POC resetting period.

Video encoder 20 then outputs all pictures that are stored to a DPB (150). For example, video encoder 20 may output all pictures marked "needed for output." except for any pictures stored to the DPB that are included in the current access unit. Video encoder 20 may output the pictures from the DPB after assigning the current slice to a POC resetting period (e.g., encoding the slice header), but prior to encoding video data of the first slice.

Video encoder 20 may then perform POC resetting and form a reference picture list (152). Video encoder 20 further signals POC values of the reference pictures included in the reference picture list (154). For example, video encoder 20 may encode POC values (or portions of the POC values, e.g., POC LSB values) for the reference pictures in a parameter set such as an SPS or PPS, and/or in a slice header for the slice. Some reference pictures (e.g., long-term reference pictures) may be signaled in the parameter set, whereas other reference pictures (e.g., short-term reference pictures) may be signaled in the slice header.

It should be understood that the steps of forming the reference picture list and signaling which pictures are included in the reference picture list may be performed multiple times over several different encoding passes, in order to determine the set of reference pictures that yields the best rate-distortion characteristics for, e.g., blocks of the current slice. That is, video encoder 20 may select the set of reference pictures included in the reference picture list based on characteristics of all blocks in the current slice, and not just based on the individual characteristics of a single block.

Video encoder 20 may then predict the current block of the current slice (156). For example, video encoder 20 may calculate one or more prediction units (PUs) for the current block. More particularly, motion estimation unit 42 may perform a motion search for the current block among the reference pictures of the reference picture list to identify a matching block used as a reference block, e.g., based on SAD, SSD, MAD. MSD, or other error calculation metrics. Motion estimation unit 42 may produce a motion vector for the current block based on the motion search Video encoder 20 may then encode motion information for the block (158), which may include motion vector difference values for the motion vector, a reference picture list identifier, and a reference index, which together identify the reference block.

Video encoder 20 may then calculate a residual block for the current block, e.g., to produce a transform unit (TU) (160). To calculate the residual block, video encoder 20 may calculate a difference between the original, uncoded block and the predicted block for the current block. Video encoder 20 may then transform and quantize coefficients of the residual block (162). Next, video encoder 20 may scan the quantized transform coefficients of the residual block (164). During the scan, or following the scan, video encoder 20 may entropy encode the coefficients (166). For example, video encoder 20 may encode the coefficients using CAVLC or CABAC. Video encoder 20 may then output the entropy coded data of the block (168).

In this manner, the method of FIG. 4 represents an example of a method including encoding, by a video encoder, encode data that indicates a POC reset for a POC value of a first picture of a first received layer of multi-layer video data, where the first picture is included in an access unit, and, based on the data that indicates the POC reset for the POC value of the first picture and prior to encoding the first picture, output all pictures stored in a DPB that precede the first picture in coding order and that are not included in the access unit.

Figure 5:
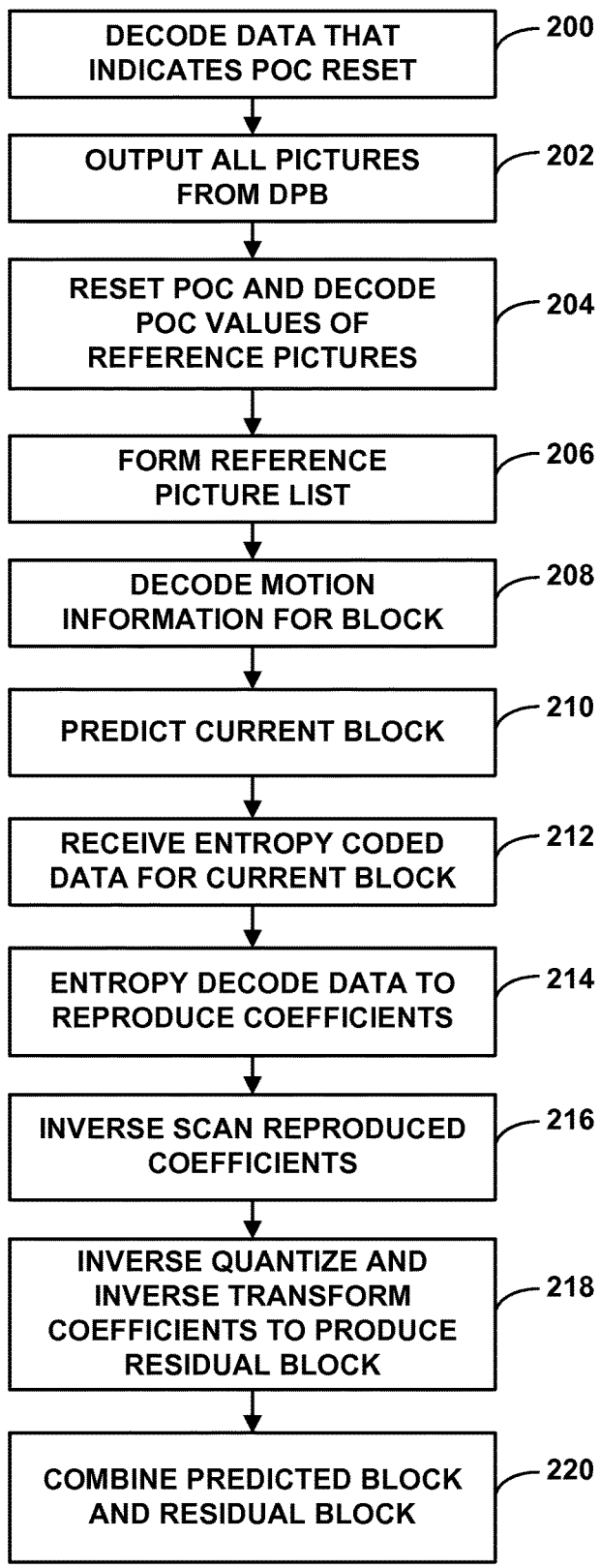
FIG. 5 is a flowchart illustrating an example method for decoding data including outputting pictures of a DPB prior to performing a POC value reset in accordance with the techniques of this disclosure.

FIG. 5 is a flowchart illustrating an example method for decoding data including outputting pictures of a DPB prior to performing a POC value reset in accordance with the techniques of this disclosure. In addition, the method of FIG. 5 includes decoding a current block. The current block may comprise a current CU or a portion of the current CU. Although described with respect to video decoder 30 (FIGS. 1 and 3), it should be understood that other devices may be configured to perform a method similar to that of FIG. 5.

Initially, video decoder 30 decodes data that indicates a POC reset (200). In some examples, as described herein, the data that indicates the POC reset may be a POC resetting identifier that is included in a slice segment header of the current slice. In such examples, video decoder 30 may further decode a POC resetting type indicator. The method of FIG. 5 is based on the assumption that the POC resetting period identifier indicates that the current slice is part of a new POC resetting period. Video decoder 30 may further determine that the current picture is the first picture in a particular access unit (e.g., the picture with the lowest layer identifier among all pictures of a particular access unit).

Video decoder 30 may output all pictures from stored to a DPB (202). For example, according to aspects of this disclosure, based on the data that indicates a POC value reset, video decoder 30 may output all pictures from the DPB that have been marked "needed for output," except for any pictures stored to the DPB that are included in the current access unit. Video decoder 30 may output the pictures from the DPB after decoding the slice header for the current slice, but prior to deriving POC values and decoding reference pictures.

Video decoder 30 then resets POC values and decodes POC values of reference pictures to be included in a reference picture list (204), e.g., from the slice segment header and/or a parameter set such as a PPS or SPS. Video decoder 30 then forms the reference picture list (206).

Next, video decoder 30 decodes motion information for a current block (208). The motion information may include, for example, a reference picture list identifier and a reference index into the reference picture list. Video decoder 30 then predicts the current block (200), e.g., using inter-prediction mode to calculate a predicted block for the current block. More particularly, video decoder 30 uses the reference picture list identifier to identify which reference picture list to use, and the reference index to identify a reference index in the reference picture list. Video decoder 30 then decodes a motion vector for the current block and identifies a reference block in the identified reference picture.

Video decoder 30 may also receive entropy coded data for the current block, such as entropy coded data for coefficients of a residual block corresponding to the current block (212). Video decoder 30 may entropy decode the entropy coded data to reproduce coefficients of the residual block (214). Video decoder 30 may then inverse scan the reproduced coefficients (216), to create a block of quantized transform coefficients. That is, using the inverse scan, video decoder 30 converts a one-dimensional vector to a two-dimensional matrix. Video decoder 30 may then inverse quantize and inverse transform the coefficients to produce a residual block (218). Video decoder 30 may ultimately decode the current block by combining the predicted block and the residual block (220).

In this manner, the method of FIG. 5 represents an example of a method including decoding data that indicates a POC reset for a POC value of a first picture of a first received layer of multi-layer video data, where the first picture is included in an access unit, and, based on the data that indicates the POC reset for the POC value of the first picture and prior to decoding the first picture, outputting all pictures stored in a DPB that precede the first picture in coding order and that are not included in the access unit.

Figure 6:
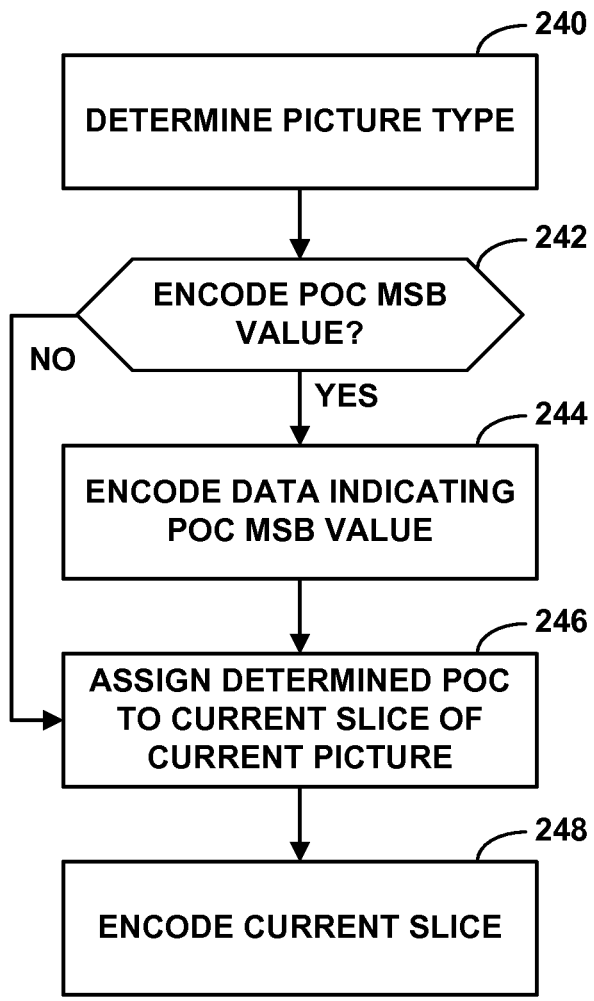
FIG. 6 is a flowchart illustrating an example method for encoding data including encoding data indicating a POC MSB value in accordance with the techniques of this disclosure.

FIG. 6 is a flowchart illustrating an example method for encoding data including encoding data indicating a POC MSB value in accordance with the techniques of this disclosure. Although described with respect to video encoder 20 (FIGS. 1 and 2), it should be understood that other devices may be configured to perform a method similar to that of FIG. 6.

In this example, video encoder 20 may determine a picture type for a picture currently being encoded (240). In some instances, the picture type of the current picture may be a random access picture type, such as the above-described CRA, BLA, or other random access picture types.

According to aspects of this disclosure, based on the picture type, video encoder 20 may determine whether to encode data that indicates a POC MSB value for the current picture (242). For example, video encoder 20 may encode data indicating a POC MSB value certain picture types. That is, video encoder 20 may only encode a POC MSB value when the picture is included in a first set of picture types, and video encoder 20 may not encode the POC MSB value when the picture is not included in the first set of picture types. In an example for purposes of illustration, video encoder 20 may encode data indicating a POC MSB value for pictures having a CRA or BLA picture type. In other examples, video encoder 20 may additionally or alternatively encode data indicating the POC MSB value for other pictures and picture types. For example, according to aspects of this disclosure, video encoder 20 may encode data indicating a POC MSB value for any picture for which POC value resetting is performed.

If the POC MSB value is signaled (the yes branch of step 242), video encoder 20 may encode data indicating the POC MSB value. For example, video encoder 20 may encode one or more syntax elements that indicate that POC MSB value for the current picture.

Video encoder 20 may then assign the determined POC value to a current slice of a current picture 246 (246). Video encoder 20 may also encode the current slice (248). In some examples, video encoder 20 may encode the current slice using a technique similar to that described with respect to steps 156-168 of the example of FIG. 4.

In this manner, the method of FIG. 6 represents an example of a method including encoding, by a video encoder, a first picture of multi-layer video data, where the first picture has a first picture type, and, based on the first picture having the first picture type, encoding data representative of a POC MSB value for the first picture.

Figure 7:
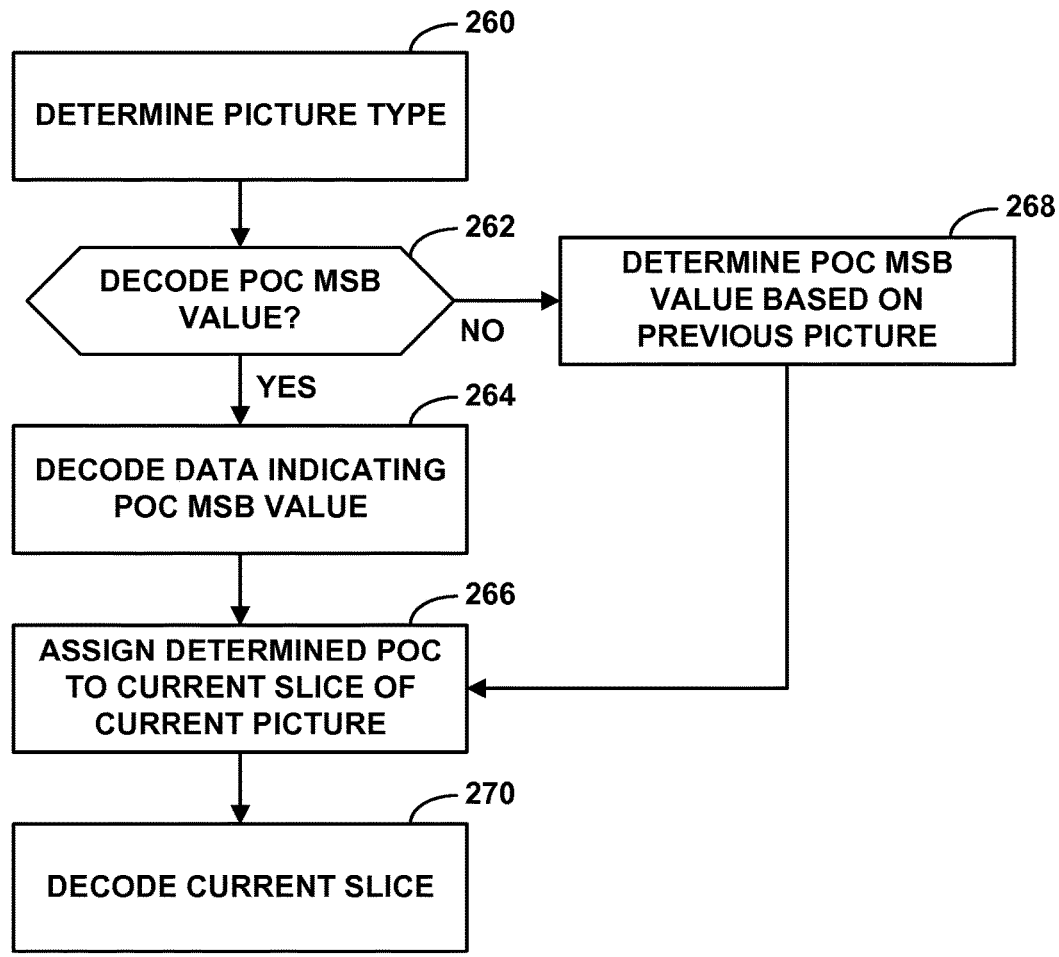
FIG. 7 is a flowchart illustrating an example method for decoding data including decoding data indicating a POC MSB value in accordance with the techniques of this disclosure.

FIG. 7 is a flowchart illustrating an example method for decoding data including decoding data indicating a POC MSB value in accordance with the techniques of this disclosure. Although described with respect to video decoder 30 (FIGS. 1 and 3), it should be understood that other devices may be configured to perform a method similar to that of FIG. 7.

In this example, video decoder 30 may determine a picture type for a picture currently being decoded (260). In some instances, the picture type of the current picture may be a random access picture type, such as the above-described CRA, BLA, or other random access picture types.

According to aspects of this disclosure, based on the picture type, video decoder 30 may determine whether to decode data that indicates a POC MSB value for the current picture (262). For example, video decoder 30 may decode data indicating the POC MSB value for the picture, rather than determining the POC MSB value for the picture based on the POC MSB value of the picture coded prior to the current picture in decoding order. That is, video decoder 30 may only decode a POC MSB value when the current picture is included in a first set of picture types, and video decoder 30 may not decode the POC MSB value when the picture is not included in the first set of picture types. In some instances, video decoder 30 may decode data indicating the POC MSB value for the current picture based on the picture type being a CRA or BLA picture type. In other examples, video decoder 30 may additionally or alternatively decode data indicating the POC MSB value for other pictures and picture types. For example, according to aspects of this disclosure, video decoder 30 may decode data indicating a POC MSB value for any picture for which POC value resetting is performed.

If video decoder 30 does decode data indicating the POC MSB value (the yes branch of step 262), video decoder 30 may decode the data that indicates the POC MSB value (264). For example, video decoder 30 may decode one or more syntax elements that indicate a POC MSB value for the current picture. If video decoder 30 does not decode data indicating the POC MSB value (the no branch of step 262), video decoder 30 may determine a POC value for a current picture based on a POC MSB value of a picture decoded prior to the current picture in decoding order.

Video decoder 30 may then assign the determined POC value to a current slice of a current picture 246 (266). Video decoder 30 may also decode the current slice (270). In some examples, video decoder 30 may decode the current slice using a technique similar to that described with respect to steps 206-220 of the example of FIG. 5.

In this manner, the method of FIG. 7 represents an example of a method including decoding, by a video decoder, a first picture of multi-layer video data, where the first picture has a first picture type, and, based on the first picture having the first picture type, decoding data representative of a POC MSB value for the first picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM. EEPROM. CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, by a video decoder, a first picture of a first layer of multi-layer video data, wherein the first picture has a first picture type;
    based on the first picture having the first picture type, decoding, by the video decoder, data representative of picture order count (POC) most significant bits (MSB) value for the first picture;
    determining a POC MSB delta value based on the data representative of the POC MSB value, the POC MSB delta value indicating an amount to decrement POC values of one or more pictures stored to a decoded picture buffer; and
    decrementing the POC values of the one or more pictures stored to the decoded picture buffer by the POC MSB delta value.

2. The method of claim 1, wherein decoding the data representative of the POC MSB value based on the first picture having the first picture type comprises:
    determining whether the first picture type is included in a first set of picture types for which MSB values are coded or a second set of picture types for which MSB values are not coded; and
    decoding the data representative of the POC MSB value for the picture only when the first picture type is included in the first set of picture types.

3. The method of claim 1, further comprising, based on the data representative of the POC MSB for the first picture and without referencing a POC MSB value for a second picture of the multi-layer video data that precedes the first picture in coding order, determining the POC MSB for the first picture.

4. The method of claim 3, further comprising constructing, by the video decoder, a reference picture list that includes the first picture having the determined POC MSB value.

5. The method of claim 1, wherein the first picture type comprises at least one of a clean random access (CRA) picture or a broken link access (BLA) picture.

6. The method of claim 1, wherein decoding the data representative of the POC MSB value for the first picture comprises decoding the data representative of the POC MSB value from a slice header extension.

7. The method of claim 1, wherein decoding the data representative of the POC MSB value for the first picture comprises decoding a poc_msb_val syntax element.

8. The method of claim 1, further comprising determining the first picture type based on a network abstraction layer (NAL) unit type of the first picture.

9. A method of encoding video data, the method comprising:
    encoding, by a video encoder, a first picture of multi-layer video data, wherein the first picture has a first picture type; and
    based on the first picture having the first picture type, encoding, by the video encoder, data representative of picture order count (POC) most significant bits (MSB) value for the first picture;
    determining a POC MSB delta value based on the data representative of the POC MSB value, the POC MSB delta value indicating an amount to decrement POC values of one or more pictures stored to a decoded picture buffer; and
    decrementing the POC values of the one or more pictures stored to the decoded picture buffer by the POC MSB delta value.

10. The method of claim 9, wherein encoding the data representative of the POC MSB value based on the first picture having the first picture type comprises:
    determining whether the first picture type is included in a first set of picture types for which MSB values are coded or a second set of picture types for which MSB values are not coded; and
    encoding the data representative of the POC MSB value for the picture only when the first picture type is included in the first set of picture types.

11. The method of claim 9, further comprising, based on the data representative of the POC MSB for the first picture and without referencing a POC MSB value for a second picture of the multi-layer video data that precedes the first picture in coding order, determining the POC MSB for the first picture.

12. The method of claim 11, further comprising constructing, by the video encoder, a reference picture list that includes the first picture having the determined POC MSB value.

13. The method of claim 9, wherein the first picture type comprises at least one of a clean random access (CRA) picture or a broken link access (BLA) picture.

14. The method of claim 9, wherein encoding the data representative of the POC MSB value for the first picture comprises encoding the data representative of the POC MSB value in a slice header extension.

15. The method of claim 9, wherein encoding the data representative of the POC MSB value for the first picture comprises decoding a poc_msb_val syntax element.

16. The method of claim 9, further comprising determining the first picture type based on a network abstraction layer (NAL) unit type of the first picture.

17. A device for coding video data, the device comprising:
a memory configured to store multi-layer video data; and
a video coder configured to:
  code a first picture of the multi-layer video data, wherein the first picture has a first picture type;
  based on the first picture having the first picture type, code data representative of picture order count (POC) most significant bits (MSB) value for the first picture;
  determine a POC MSB delta value based on the data representative of the POC MSB value, the POC MSB delta value indicating an amount to decrement POC values of one or more pictures stored to a decoded picture buffer; and
  decrement the POC values of the one or more pictures stored to the decoded picture buffer by the POC MSB delta value.

18. The device of claim 17, wherein to code the data representative of the POC MSB value based on the first picture having the first picture type, the video coder is configured to:
  determine whether the first picture type is included in a first set of picture types for which MSB values are coded or a second set of picture types for which MSB values are not coded; and
  code the data representative of the POC MSB value for the picture only when the first picture type is included in the first set of picture types.

19. The device of claim 17, wherein the video coder is further configured to, based on the data representative of the POC MSB for the first picture and without referencing a POC MSB value for a second picture of the multi-layer video data that precedes the first picture in coding order, determine the POC MSB for the first picture.

20. The device of claim 19, wherein the video coder is further configured to construct a reference picture list that includes the first picture having the determined POC MSB value.

21. The device of claim 17, wherein the first picture type comprises at least one of a clean random access (CRA) picture or a broken link access (BLA) picture.

22. The device of claim 17, wherein to code the data representative of the POC MSB value for the first picture, the video coder is configured to code the data representative of the POC MSB value from a slice header extension.

23. The device of claim 17, wherein the device comprises at least one of:
  an integrated circuit;
  a microprocessor; or
  a wireless communication device.

24. A device for coding video data, the device comprising:
  means for coding a first picture of multi-layer video data, wherein the first picture has a first picture type;
  means for coding, based on the first picture having the first picture type, data representative of picture order count (POC) most significant bits (MSB) value for the first picture;
  means for determining a POC MSB delta value based on the data representative of the POC MSB value, the POC MSB delta value indicating an amount to decrement POC values of one or more pictures stored to a decoded picture buffer; and
  means for decrementing the POC values of the one or more pictures stored to the decoded picture buffer by the POC MSB delta value.

25. The device of claim 24, wherein the means for coding the data representative of the POC MSB value based on the first picture having the first picture type comprises:
  means for determining whether the first picture type is included in a first set of picture types for which MSB values are coded or a second set of picture types for which MSB values are not coded; and
  means for coding the data representative of the POC MSB value for the picture only when the first picture type is included in the first set of picture types.

26. The device of claim 24, further comprising, based on the data representative of the POC MSB for the first picture and without referencing a POC MSB value for a second picture of the multi-layer video data that precedes the first picture in coding order, means for determining the POC MSB for the first picture.

27. The device of claim 26, further comprising means for constructing a reference picture list that includes the first picture having the determined POC MSB value.

28. The device of claim 24, wherein the first picture type comprises at least one of a clean random access (CRA) picture or a broken link access (BLA) picture.

29. The device of claim 24, wherein the means for coding the data representative of the POC MSB value for the first picture comprises means for coding the data representative of the POC MSB value from a slice header extension.

30. A non-transitory computer-readable storage medium having stored thereon instructions that, when executed, cause a processor of a device for coding video data to:
  code a first picture of multi-layer video data, wherein the first picture has a first picture type; and
  based on the first picture having the first picture type, code data representative of picture order count (POC) most significant bits (MSB) value for the first picture;
  determine a POC MSB delta value based on the data representative of the POC MSB value, the POC MSB delta value indicating an amount to decrement POC values of one or more pictures stored to a decoded picture buffer; and
  decrement the POC values of the one or more pictures stored to the decoded picture buffer by the POC MSB delta value.

31. The non-transitory computer-readable storage medium of claim 30, wherein to code the data representative of the POC MSB value based on the first picture having the first picture type, the instructions cause the processor to:
  determine whether the first picture type is included in a first set of picture types for which MSB values are coded or a second set of picture types for which MSB values are not coded; and
  code the data representative of the POC MSB value for the picture only when the first picture type is included in the first set of picture types.

32. The non-transitory computer-readable storage medium of claim 30, wherein the instructions further cause the processor to, based on the data representative of the POC MSB for the first picture and without referencing a POC MSB value for a second picture of the multi-layer video data that precedes the first picture in coding order, determine the POC MSB for the first picture.

33. The non-transitory computer-readable storage medium of claim 32, wherein the instructions further cause the processor to construct a reference picture list that includes the first picture having the determined POC MSB value.

34. The non-transitory computer-readable storage medium of claim 30, wherein the first picture type comprises at least one of a clean random access (CRA) picture or a broken link access (BLA) picture.

35. The non-transitory computer-readable storage medium of claim 30, wherein to code the data representative of the POC MSB value for the first picture, the instructions cause the processor to code the data representative of the POC MSB value from a slice header extension.

\* \* \* \* \*